United States Patent [19]

Takeda et al.

[11] Patent Number: 5,761,174
[45] Date of Patent: Jun. 2, 1998

[54] OPTICAL PICKUP DEVICE WITH SPLIT HOLOGRAM ELEMENT THAT DIFFRACTS LIGHT IN DIRECTION PARALLEL TO TRACK

[75] Inventors: Tadashi Takeda; Yoshio Hayashi; Ikuo Kasuga; Kazuo Higashiura; Noriyuki Satoh; Hisahiro Ishihara, all of Nagano, Japan

[73] Assignee: Kabushiki Kaisha Sankyo Seiki Seisakusho, Nagano, Japan

[21] Appl. No.: 523,147

[22] Filed: Sep. 5, 1995

[30] Foreign Application Priority Data

Sep. 2, 1994 [JP] Japan .................. 6-234441

[51] Int. Cl.$^6$ .................................. G11B 7/135
[52] U.S. Cl. .............. 369/103; 369/44.37; 369/112; 369/109; 369/44.23
[58] Field of Search .................. 369/44.12, 112, 369/122, 44.37, 116, 44.26, 44.23, 109, 120, 110

[56] References Cited

U.S. PATENT DOCUMENTS 5,446,719  8/1995  Yoshida et al. .................. 369/116
5,450,387  9/1995  Ono et al. ....................... 369/44.37
5,490,133  2/1996  Nakamura et al. ............... 369/44.23
5,511,059  4/1996  Brazas, Jr. ....................... 369/109

*Primary Examiner*—Georgia Y. Epps
*Assistant Examiner*—Kim-Kwok Chu
*Attorney, Agent, or Firm*—Sughrue, Mion, Zinn, Macpeak & Seas, PLLC

[57] ABSTRACT

An optical pickup device includes a light source irradiating a record medium with plural light spots of light emitted therefrom, a plurality of light detecting elelments to which reflected light of the light spots are guided, respectively, to adequately synthesize and compare outputs of said light detecting elements, thereby reading information recorded in tracks of the record medium, and detecting an tracking error and a focusing error, and a hologram element which splits light emitted from the light source into plural beams is disposed in an optical path between the light source and the record medium, said hologram element is split by a split line, said split line elongating in a direction perpendicular to a track of the medium on an optical axis, and a hologram pattern having a diffraction function which is substantially directed in the track direction is disposed on at least one side of said split line, thereby differentiating diffraction conditions on both sides of said split line from each other.

17 Claims, 13 Drawing Sheets

FIG. 1
FIG. 3
FIG. 2
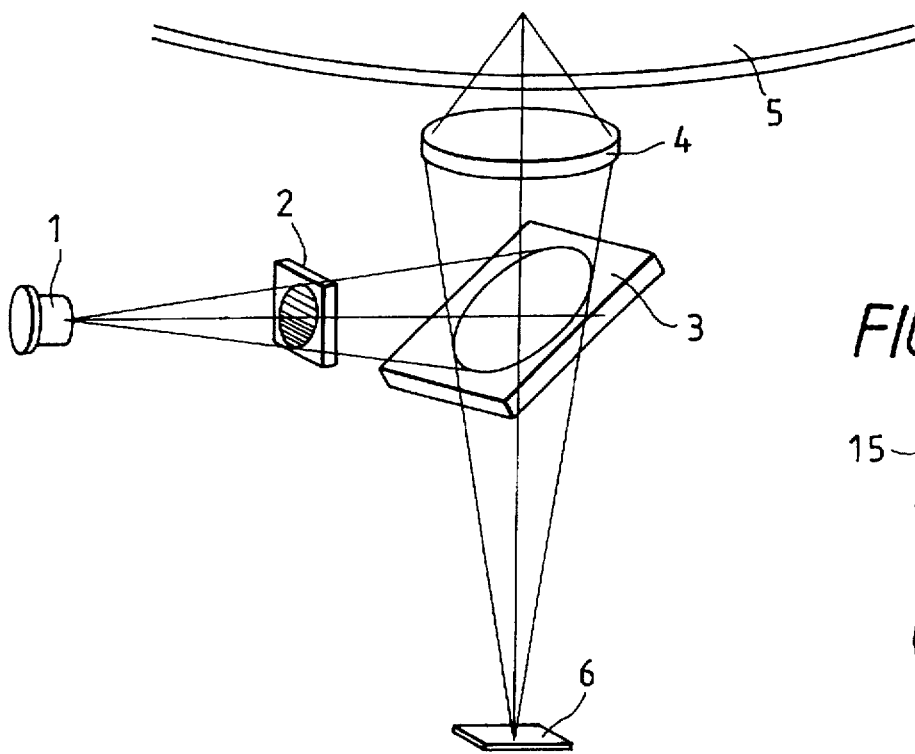
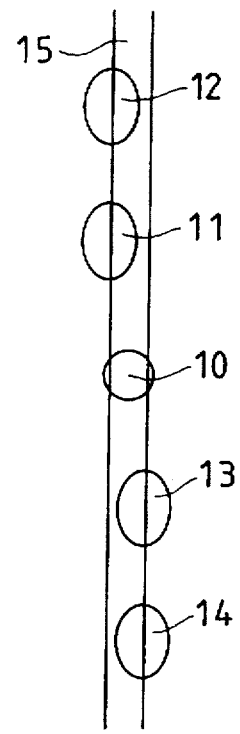
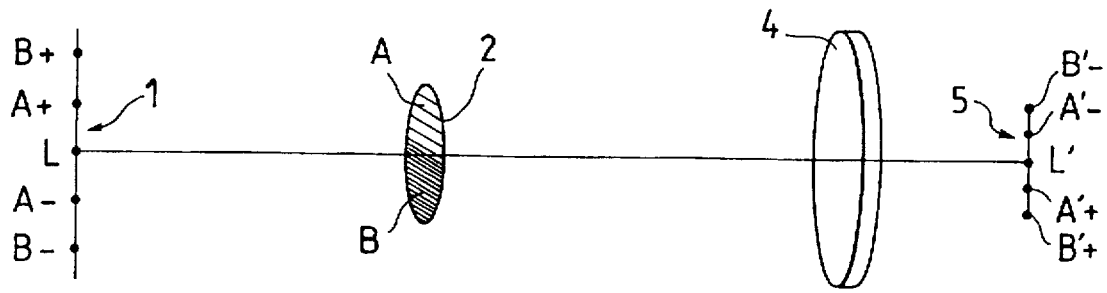

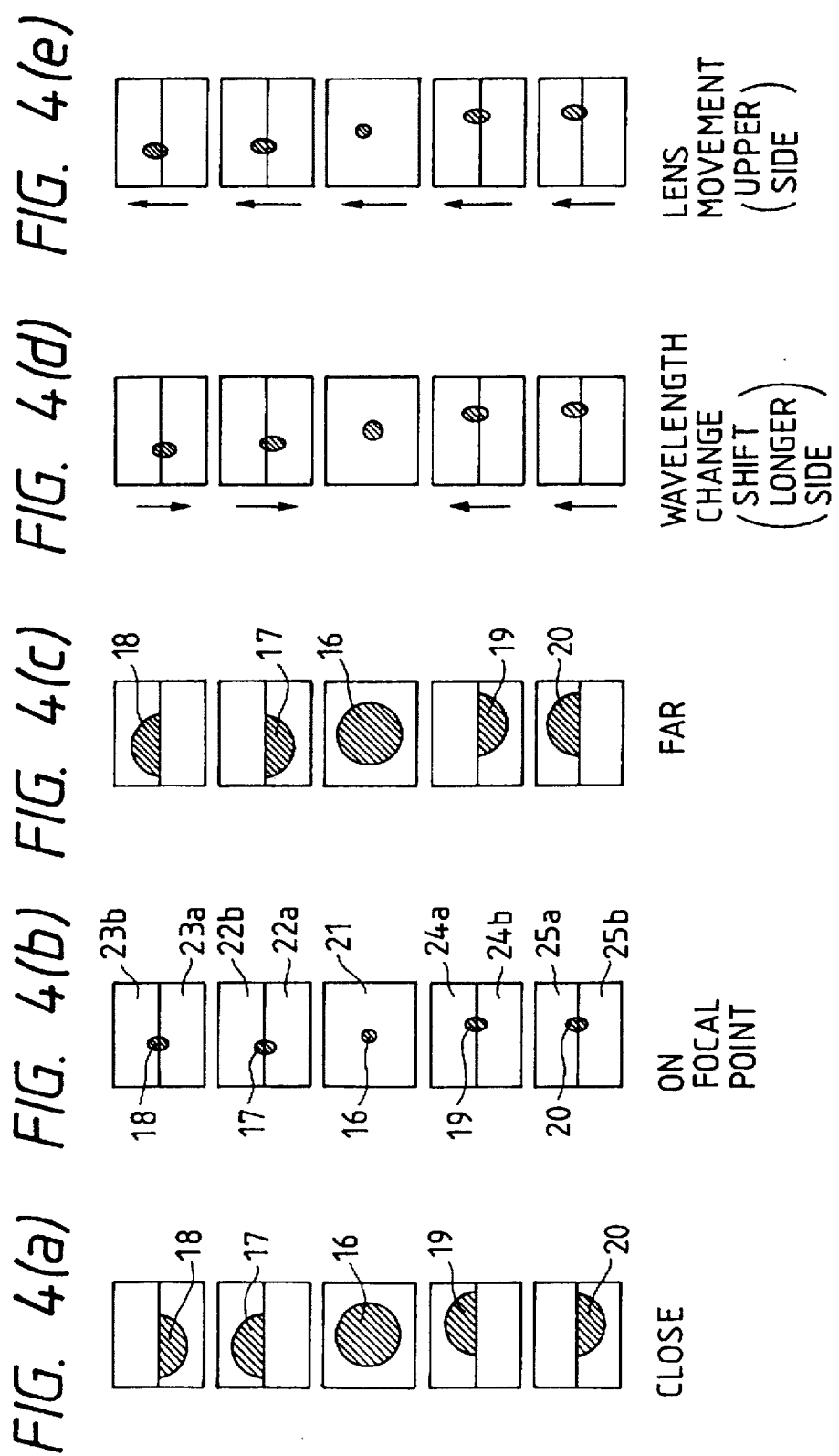

CLOSE     ON FOCAL POINT     FAR

FIG. 12
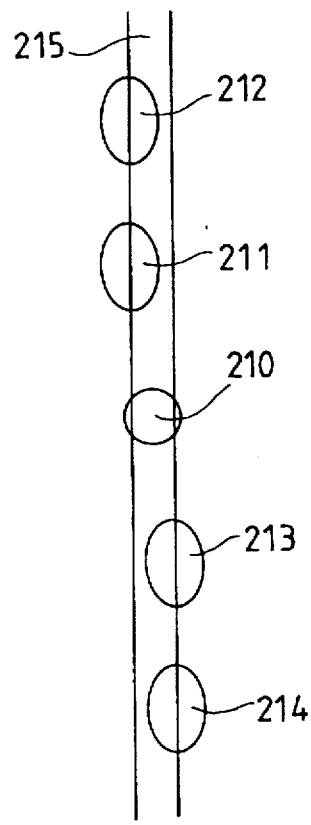
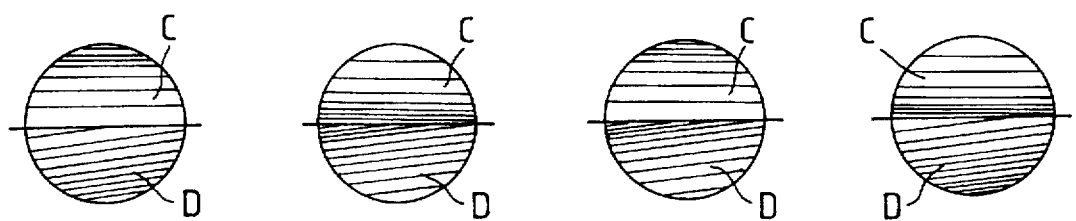
FIG. 13(a)   FIG. 13(b)   FIG. 13(c)   FIG. 13(d)

CLOSE  ON FOCAL POINT  FAR

CLOSE  ON FOCAL POINT  FAR

OPTICAL PICKUP DEVICE WITH SPLIT HOLOGRAM ELEMENT THAT DIFFRACTS LIGHT IN DIRECTION PARALLEL TO TRACK

BACKGROUND OF THE INVENTION

1. Field of the invention

The invention relates to an optical pickup device which reads out information from an information record medium such as an optical disk or a magneto optical disk.

2. Related art

In a CD (compact disk), for example, recorded information is stored as a pit string (track) formed on a disk face. As a pickup device for reading such recorded information, a device using the 3-beam astigmatism method such as shown in FIG. 24 is frequently used.

In the device, light of a laser light source 1 is guided to an objective lens 4 through a diffraction grating 7 and a half-mirror 3, an information track (pit string) on a disk 5 is irradiated with coherent light, and reflected light is guided to an optical detector 9 through the objective lens 4, the half-mirror 3, and a cylindrical lens 8. When the irradiated spot position on the disk 5 reaches an edge portion of a pit, an interference effect between reflected light and irradiating light causes the amount of reflected light to be reduced as compared with the case where light is reflected from a flat portion other than pits. In the optical pickup device, the change in amount of reflected light corresponding to the pit string is converted by the optical detector into an electrical signal, and the electrical signal is output.

In an actual optical disk, it is impossible to obtain an ideal flatness in which the surface is completely free from warpage or distortion. In consideration also of surface deflection and the like, it is very important to adequately hold the positional relationship between the objective lens 4 of the pickup and the disk surface. Therefore, a position control in the tracking direction is conducted so that the irradiating light such as a laser beam from the light source 1 is not deviated from the pit string (track), and also a focus control is conducted so that the focusing position of the laser beam always coincides with the information face of the disk. In the prior art, as a method of detecting the current position which is used in such controls, it is usual to employ the 3-beam method in the detection of a tracking error (TE), and the astigmatism method in the detection of a focusing error (FE).

FIGS. 24 and 25 show the methods of the prior art. In the 3-beam method, a laser beam is divided by the diffraction grating 7 into three light beams, i.e., zero-order light which has undergone no diffraction, and plus and minus first-order diffracted lights, and three light spots are focused on the disk 5 so as to be arranged at positions each forming a small angle with respect to an information track. The servo control is conducted so that reflected light signals from the plus and minus first-order diffracted light spots at the both ends are always equal in level to each other, thereby maintaining the position of the middle zero-order light spot at the center of the track. In the astigmatism method, astigmatism is produced in a reflected light beam from the surface of the disk 5 by the cylindrical lens 8, and the change in spot shape (the direction and ellipticity of an ellipse) caused by a focusing error is detected by a focusing error (FE) signal. For example, the focusing error (FE) signal is produced by, in a 4-split optical detector 26 functioning as the optical detector 9, comparing the magnitudes of the diagonal component outputs of two pairs of light detecting elements (26a and 26d, and 26b and 26c) are compared with each other by using adders 33 and 34, and a comparator 35.

In the prior art focusing error (FE) detection according to the astigmatism method, as shown in FIG. 25, the focusing error (FE) signal is obtained from a calculation result of the outputs of the 4-split optical detector 26, and hence the center of the signal light spot is positioned on the split line (dead zone) of the 4-split optical detector 26. On the other hand, in this method, a high frequency (RF) signal of read out record data is obtained from, for example, the total sum of the outputs of the light detecting elements of the 4-split optical detector 26 (i.e., the total sum of the outputs obtained by the adders 33, 34, and 36). In both the cases, the light spot center where the optical power density is high exists in the dead zone as described above. When the spot diameter is changed or the spot position is moved, therefore, the rate of the area occupied by the dead zone in the light spot is changed so that the output signal is varied in level. In other words, the operation itself of the lens actuator for the tracking and focusing controls causes the level variation of the output signal (i.e., jitter), thereby producing a problem in that the jitter characteristics are impaired.

SUMMARY OF THE INVENTION

It is a first object of the invention to provide an optical pickup device which is not affected by a dead zone of an optical detector, and in which, even when the spot diameter is changed or the spot position is moved, the level of the output signal is prevented from being changed so that excellent jitter characteristics are attained.

It is a second object of the invention to provide an optical pickup device which can attain the first object, and in which the signal processing system can be simplified.

It is a third object of the invention to provide an optical pickup device which can attain the first object, and in which parts can easily be mounted and adjusted.

As described above, it is usual to employ the 3-beam method in the detection of a tracking error (TE), and the astigmatism method in the detection of a focusing error (FE). In addition to these methods, the push-pull method, the heterodyne method, etc. may be used as the tracking error (TE) detecting means, and the knife-edge method, the Foucault method, etc. may be used as the focusing error (FE) detecting means. In all the methods, only information of one track on which a light spot is currently focused and which is currently tracked is read out. In all the methods, namely, while conducting the tracking and focusing controls on one track, information recorded in the track is read out as an output signal, with the result that one reading operation can read out information of one track.

Therefore, it is a fourth object of the invention to provide an optical pickup which can attain the first object, and which can improve the reading efficiency in the following manner. The track pitch is constant and the track interval is narrow. When three light beams for detecting a high frequency (RF) signal are formed so as to coincide with the track interval, therefore, the tracking and focusing are conducted on also the tracks on the both sides of the track which is subjected to the tracking and focusing controls. In view of the above, light of one light source is split into three beams for detecting a high frequency (RF) signal and then impinged onto a medium, and reflected lights of the three beams are independently detected so that information of three tracks is simultaneously read out by one reading operation, thereby improving the reading efficiency.

According to one aspect of the present invention, there is provided an optical pickup device comprising: a light sourse irradiating a record medium with plural light spots of light emitted therefrom; a plurality of light detecting elements to which reflected light of the light spots are guided. respectively, to adequately synthesize and compare outputs of said light detecting elements, thereby reading information recorded in tracks of the record medium, and detecting an tracking error and a focusing error; and a hologram element which splits light emitted from the light source into plural beams is disposed in an optical path between the light source and the record medium, said hologram element is split by a split line, said split line elongating in a direction perpendicular to a track of the medium on an optical axis, and a hologram pattern having a diffraction function which is substantially directed in the track direction is disposed on at least one side of said split line, thereby differentiating diffraction conditions on both sides of said split line from each other.

BRIEF DESCRIPTION OF THE DRAWINGS

FIG. 1 is a diagram of a fundamental configuration of an optical pickup which is a first embodiment of the invention;

FIG. 2 is a diagram illustrating the principle of an operation in which light beams are converged on a record face of a disk by a hologram element used in the first embodiment;

FIG. 3 is a diagram illustrating irradiation states of five spots on a face of an optical disk in the first embodiment;

FIGS. 4 (a) to 4 (e) are diagrams illustrating states of light spots on a light receiving face of the optical detector in the first embodiment;

FIG. 12 is a diagram illustrating irradiation states of five spots on a face of an optical disk in the third embodiment;

FIGS. 13 (a) to 13 (d) are diagrams showing combinations of diffraction gratings in which the grating interval is modulated and which are used in the third embodiment;

DETAILED DESCRIPTION OF THE PREFERRED EMBODIMENTS

Figure 5:
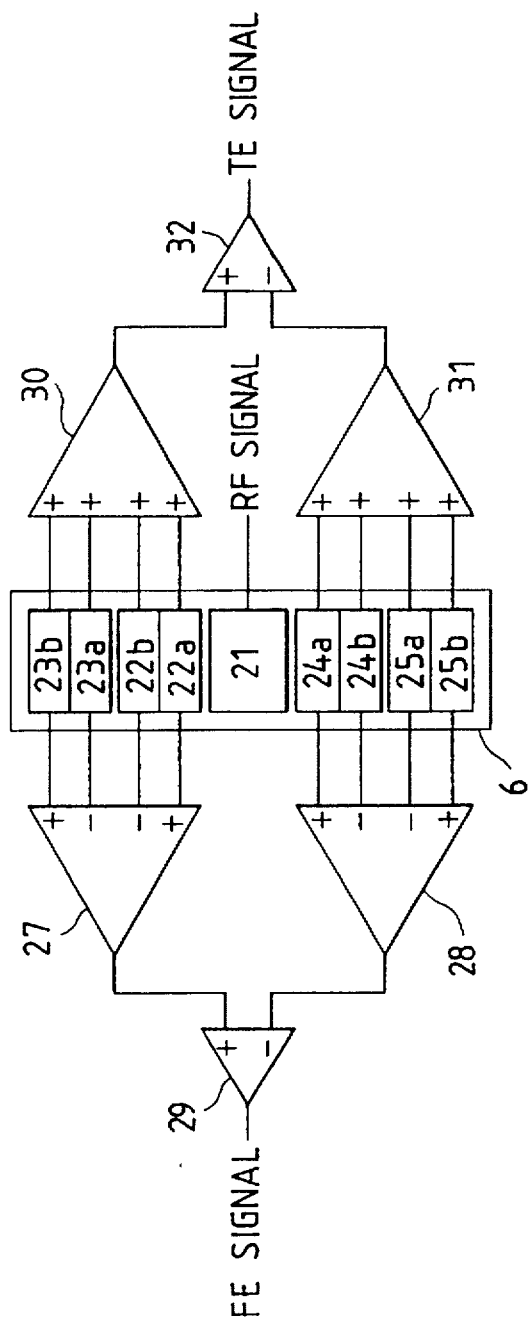
FIG. 5 is a diagram illustrating connections for obtaining an RF signal, an FE signal, a TE signal from outputs of light detecting elements of the optical detector in the first embodiment.

Hereinafter, a first embodiment of the invention will be described in detail with reference to FIGS. 1 to 6.

FIG. 1 is a diagram schematically showing an optical pickup device of the first embodiment of the invention. Light emitted from a semiconductor laser 1 which functions as a light source is split into plural light beams by a hologram element 2, and then converged in the form of plural light spots by an objective lens 4 on a record face of an optical disk 5 through a half-mirror 3. As shown in FIGS. 1, 2, and 6, the hologram element 2 is split by a split line which elongates in a direction perpendicular to a track of the medium on the optical axis. The split line is shown as a phantom line. In the hologram elements other than the element of (e) of FIG. 6, the outlines of the upper and lower hologram patterns are symmetrical about the split line. In this way, the hologram element 2 has on at least one side of the split line, hologram patterns A and B which have a diffraction function directed in the track direction, and different diffraction conditions or different grating intervals and grating directions on both sides of the split line. Although the grating intervals and grating directions will be described later, the hologram patterns A and B in the hologram elements 2 shown in FIG. 6 are arranged in the following manner. In FIG. 6 (a), patterns having a rectangular shape are separated by the split line. In FIG. 6 (b), patterns having a semicircular shape the diameter of which is on the split line are disposed symmetrically about the split line. In FIG. 6 (c), the vicinity of the split line is formed as a region where no hologram pattern exists, and patterns having a substantially semicircular shape are disposed symmetrically about the split line. In FIG. 6 (d), the vicinity of the split line is formed as a region where no hologram pattern exists, and patterns having a substantially elliptical shape are disposed symmetrically about the split line. In FIG. 6 (e), only the hologram pattern A having a semicircular shape the diameter of which is on the split line is disposed.

In the embodiment, the hologram element having the hologram patterns of FIG. 6 (b) will be described. The effects described below can be attained also in the hologram elements having other hologram patterns such as those of FIG. 6 (a), (c), (d), and (e).

The positions of the record face where beams of zero-order diffracted light and first-order diffracted lights are converged by the function of the hologram element 2 will be described with reference to a diagram of FIG. 2 illustrating the principle. In the light beam which is emitted from the semiconductor laser 1 and enters the upper hologram pattern A shown in FIG. 2, zero-order light which has undergone no diffraction passes through the hologram pattern A and enters the objective lens 4 to be converged on a point L'. First-order diffracted lights which have undergone diffraction enter the objective lens 4 as if the light source is positioned at virtual images A+ and A− which are optical axis-symmetrical about the position L of the semiconductor laser, and are then converged on points A'+ and A'−. In other words, light beams emitted from the hologram pattern A are converged by the objective lens 4 on the corresponding positions (conjugates) of the record face, respectively. Specifically, zero-order light is converged on the point L' which is the conjugate of the position L, and first-order lights are converged on the points A'+ and A'− which are the conjugates of A+ and A−.

The same description as the above is applied also to the light beams which are emitted from the semiconductor laser and enter the lower hologram pattern B shown in FIG. 2. Namely, zero-order light is converged on the point L' which is the conjugate of the position L, and first-order lights are converged on points B'+ and B'− which are the conjugates of B+ and B−. Consequently, light emitted from the semiconductor laser is formed into light beams of zero-order and first-order diffracted light by the functions of the upper and lower hologram patterns A and B, and then passes through the objective lens 4 to be converged as light spots on the five points L', A'+, A'−, B'+, and B'− of the record face of the optical disk 5.

In practice, the light spots are not arranged in a line in a three-dimensional space. In order to illustrate the relationships between the focal points of the light spots in the optical axis direction, for the sake of convenience, the positions of the light spots as seen in a direction perpendicular to the optical axis are shown in FIG. 2.

Next, the optical spots as seen in a direction perpendicular to the record face of the optical disk 5 are shown in FIG. 3. A light spot 10 which is positioned at the center of a track 15 is formed by zero-order diffracted light, and other four spots are formed by plus and minus first-order diffracted lights. A light beam which has passed through the region of the hologram element 2 where no hologram pattern is disposed is converged on the same light spot as that of zero-order diffracted light. In this case, light spots 11 and 13 of first-order diffracted lights of the hologram pattern A are located at positions which are point-symmetrical about the center light spot 10, and also light spots 12 and 14 of first-order diffracted lights of the hologram pattern B are located at positions which are point-symmetrical about the center light spot 10. With respect to these spots, first-order diffracted lights of the hologram patterns A and B can be converged on adequate positions of a track by selecting the grating intervals and grating directions of the hologram patterns A and B. The magnitude of diffraction or the distance between first-order diffracted light and zero-order diffracted light is set by the grating intervals of the hologram patterns, and the diffraction direction or the angle formed by the track direction and a straight line linking plus and minus first-order diffracted lights is set by the grating direction of the hologram pattern. Accordingly, first-order diffracted lights of the hologram patterns are converged on adequate positions of the track by adequately selecting the grating intervals and grating directions of the hologram patterns A and B. A diagrammatic shape of a light spot of such first-order diffracted light is obtained by conducting the Fourier transform on the opening shape of the corresponding hologram pattern.

According to the invention, a high frequency (RF) signal is detected by using the zero-order light which has undergone no diffraction, and a focusing error (FE) signal or a tracking error (TE) signal is detected by using the plus and minus first-order diffracted lights, thereby suppressing the above-mentioned variation of an output signal. Hereinafter, the detection processes will be sequentially described.

Next, light spots on an optical detector 6 will be described. The light spots on the record face of the optical disk 5 are reflected from the optical disk 5. The reflected beams again pass through the objective lens 4 and the half-mirror 3, and are again formed into light spots on the focal plane on the side of the optical detector. Also in this case, the positional relationships of the light spots on the focal plane on the side of the optical detector are conjugated with those of the light spots on the record face. When the positional relationship between the objective lens 4 and the optical disk 5 is moved in the direction of the optical axis or a direction perpendicular to the optical axis, therefore, the positions and shapes of the spots are changed in the same manner on both the record face and the focal plane on the side of the optical detector. The change of the positional relationship between the objective lens 4 and the optical disk 5 in the direction of the optical axis will be described with reference to FIG. 4.

The optical detector 6 comprises a light detecting element 21 which has no split line, and 2-split light detecting elements 22a and 22b to 25a and 25b each of which is split into upper and lower regions a and b by a split line.

At the focal point, as shown in FIG. 4 (b), light spots 17 and 19 of first-order diffracted lights of the hologram pattern A, and light spots 18 and 20 of first-order first-order diffracted lights of the hologram pattern B are positioned in the upper and lower sides with setting a light spot 16 of zero-order light as the center, and all the light spots are those of the minimum size. The light spot 16 is positioned at the center of the light detecting element 21, and the centers of the light spots 17 to 20 of first-order diffracted lights are positioned on the split lines of the 2-split light detecting elements 22a and 22b to 25a and 25b, respectively.

By contrast, when the distance between the objective lens 4 and the optical disk 5 is reduced, as shown in FIG. 4(a), the light spot 16 of zero-order light is not changed in position but increased in diameter. The centers of the light spots 17 and 19 of first-order diffracted lights of the hologram pattern A are moved to the upper side in FIG. 4 while the spots are increased in size so as to have a shape similar to the opening shape of the hologram pattern A, in accordance with the principle same as that of the Foucault method. At the same time, the centers of the light spots 18 and 20 of first-order diffracted lights of the hologram pattern B are moved to the lower side in FIG. 4 while the spots are increased in size so as to have a shape similar to the opening shape of the hologram pattern B. As a result, most portion of each of the light spots 17 to 20 of first-order diffracted lights is located in one side of the corresponding 2-split light detecting elements 22a and 22b to 25a and 25b. FIG. 4 shows an ideal state in which all portion of a light spot is located in one side. In practice, however, a portion of a light spot is caused to be located in the other side by blur or the like.

Conversely, when the distance between the objective lens 4 and the optical disk 5 is increased, as shown in FIG. 4(c), the light spot 16 of zero-order light is not changed in position but increased in diameter. The centers of the light spots 17 and 19 of first-order diffracted lights of the hologram pattern A are moved to the lower side in FIG. 4 while the spots are increased in size so as to have a shape similar to the vertically inverted opening shape of the hologram pattern A, in accordance with the principle same as that of the Foucault method. The centers of the light spots 18 and 20 of first-order diffracted lights of the hologram pattern B are moved to the upper side in FIG. 4 while the spots are increased in size so as to have a shape similar to the vertically inverted opening shape of the hologram pattern B.

With respect to the high frequency (RF) signal, in accordance with the degree of focusing, only the beam diameter of the light spot 16 of zero-order light is increased or decreased, and the light spot is always located on the light detecting element 21 of the optical detector 6. Since the light detecting element 21 is configured by a light detecting element having no split line, the effect due to the dead zone in the optical detector in the prior art example is never produced. Therefore, the embodiment of the invention is not affected at all by the dead zone of an optical detecting element. Even when the diameter of a light spot is changed, a high frequency (RF) output signal is not changed in level, and it is possible to conduct the signal detection having excellent jitter characteristics.

The focusing error (FE) signal is obtained in the following manner. As shown in FIG. 5, the outputs of the light detecting elements 22a and 22b to 25a and 25b of the optical detector 6 are connected so that the outputs of the 2-split light detecting elements 22a and 22b, and 23a and 23b, and those of the 2-split light detecting elements 24a and 24b, and 25a and 25b are compared by comparators 27 and 28 in a vertically inverted manner, and the comparison results are compared by a comparator 29 as follows:

$$FE=(22a+23b+24b+25a)-(22b+23a+24a+25b)$$

As a result, the focusing error (FE) signal can be obtained.

Furthermore, two variable elements will be considered. One of the variable elements is an effect produced when the wavelength of the light emitted from the semiconductor laser 1 is changed by temperature variation or the like. When the wavelength of the emitted light is changed to a longer one under the focused conditions of FIG. 4 (b), diffraction of each light spot is reduced in magnitude. As shown in FIG. 4 (d), therefore, the light spots 17 to 20 of first-order diffracted lights are moved so as to be closer to the light spot 16 of zero-order light. As the distance between a light spot and the center is larger, the moving distance of the light spot is larger or proportional to the distance between the light spot and the center. In this case, the outputs of the light detecting elements 22a, 23a, 24a, and 25a are increased, and those of the light detecting elements 22b, 23b, 24b, and 25b are reduced. These increases and decreases of the outputs are canceled by the above expression, and hence the effect produced by the change of the wavelength to a longer one can be eliminated. When the wavelength of the emitted light is changed to a shorter one, diffraction of each light spot is increased in magnitude. In contrast to the case of FIG. 4 (d), therefore, the light spots 17 to 20 of first-order diffracted lights are moved so as to be more remote from the light spot 16 of zero-order light. Since the increases and decreases of the outputs are canceled in the same manner as described above, the effect produced by the change of wavelength to a shorter one can be eliminated.

The other variable element is an effect produced when the lens is moved. When the lens is moved upward under the focused conditions of FIG. 4, all the light spots are moved upward as shown in FIG. 4(e). In this case, the outputs of the light detecting elements 22b, 23b, 24a, and 25a are increased, and those of the light detecting elements 22a, 23a, 24b, and 25b are reduced. These increases and decreases of the outputs are canceled by the above expression, and hence the effect produced by the upward movement of the lens can be eliminated. Also when the lens is moved downward, all the light spots are moved downward so that the increases and decreases of the outputs are canceled in the same manner as described above, whereby the effect produced by the downward movement of the lens can be eliminated.

Consequently, the focusing error (FE) signal can be prevented from being affected by a wavelength variation of the emitted light or a lens movement, and it is possible to conduct the signal detection having excellent jitter characteristics.

Since the hologram patterns A and B of the hologram element 2 are configured so as to have the outlines which are symmetrical about the split line, the light spots of first-order diffracted lights are substantially equal in shape and area to each other. In the synthesis and comparison of the outputs of the light detecting elements, therefore, the cancellation of the outputs of the light detecting elements can be conducted in a well-balanced manner, and hence it is possible to obtain a more stable output signal which is prevented from being affected by a wavelength variation or a lens movement.

The detection of an error in the tracking direction in the relationship between the objective lens 4 and the optical disk 5 is conducted in the strictly same manner as the conventional 3-beam method. Namely, connection is conducted in the following manner. As shown in FIG. 5, the outputs of the 2-split light detecting elements 22a and 22b, and 23a and 23b, and those of the 2-split light detecting elements 24a and 24b, and 25a and 25b are added by adders 30 and 31, and the addition results are compared by a comparator 32 as follows:

$$FE=(22a+22b+23a+23b)-(24a+24b+25a+25b)$$

This allows the tracking error (TE) signal to be detected by obtaining the difference between the plus and minus first-order diffracted lights. Even when a wavelength variation or a lens movement occurs as described above, the detection is not affected by such a wavelength variation or a lens movement because the above-mentioned difference is obtained by using sums of the regions a and b of the 2-split light detecting elements, i.e., (22a+22b) to (25a+25b) which are not eventually changed by such a variation, etc.

Alternatively, the tracking error (TE) signal may be obtained from only a suitable combination of the outputs of the 2-split light detecting elements 22a and 22b, and 24a and 24b, or the 2-split light detecting elements 23a and 23b, and 25a and 25b.

Figure 6E:
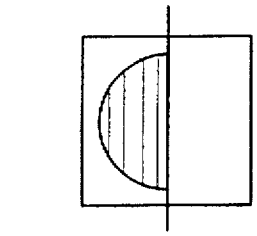
FIGS. 6 (a) to 6 (e) are diagrams illustrating a hologram pattern of the hologram element used in the first embodiment.
Figure 6D:
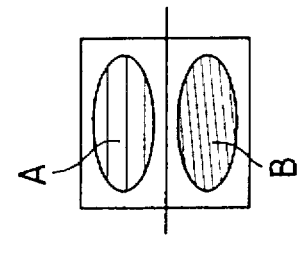
Figure 6C:
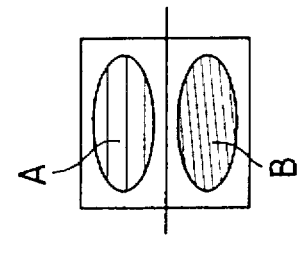
Figure 6B:
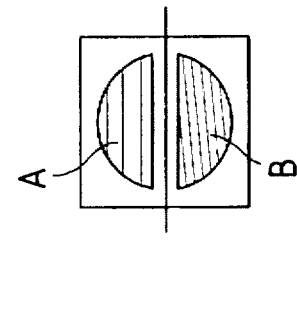
Figure 6A:
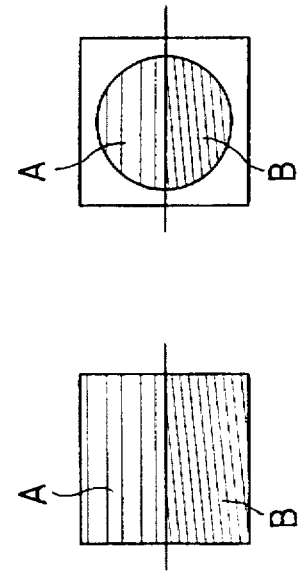

In the hologram element 2 shown in FIG. 6(e), only the hologram pattern A is disposed so that the light spots 18 and 20 are not formed. Also in this case, however, the jitter characteristics of the high frequency (RF) signal and the focusing error (FE) signal can be improved in the same manner as described above. Since the light detecting elements 23 and 25 are not required, the configuration of the light detecting elements can be simplified.

Second embodiment Next, a second embodiment of the invention in which the signal processing system can be simplified will be described in detail with reference to FIGS. 7 and 8.

Referring to FIG. 5 used in the description of the foregoing embodiment, in both the detection of the focusing error (FE) signal and that of the tracking error (TE) signal, the outputs of the light detecting elements 22$b$ and 23$a$, and 24$b$ and 25$a$ are handled so as to have the same polarity in the synthesis and comparison in the comparators 27 to 31. In view of this, in the present embodiment, the elements are integrated into one body.

The optical detector 6 used in the foregoing embodiment shown in FIG. 4 is usually configured by five light detecting elements in accordance with the above-mentioned five light spots of FIG. 3. By contrast, in an optical detector used in the second embodiment, split element pieces of a split light detecting element from which a sum of outputs is always obtained are integrated into one body so that the detector is configured by three light detecting elements. That is, as shown in FIGS. 7 and 8, the optical detector is configured by three light detecting elements 121, 122, and 123. The light detecting element 121 consists of a light detecting element which has no split line, and the light detecting elements 122 and 123 are split into three regions a, b, and c, or consist of 3-split light detecting elements 122$a$, 122$b$, and 122$c$, and 123$a$, 123$b$, and 123$c$, respectively.

When the positional relationship between the objective lens 4 and the optical disk 5 is moved in the direction of the optical axis or a direction perpendicular to the optical axis, the positions and shapes of the spots are changed in the same manner as those in the first embodiment on both the record face and the focal plane on the side of the optical detector. Changes of the light spots on the optical detector with respect to the change of the positional relationship between the objective lens 4 and the optical disk 5 in the direction of the optical axis, i.e., a focusing error will be described with reference to FIG. 7.

Figures 7A, 7B, 7C:
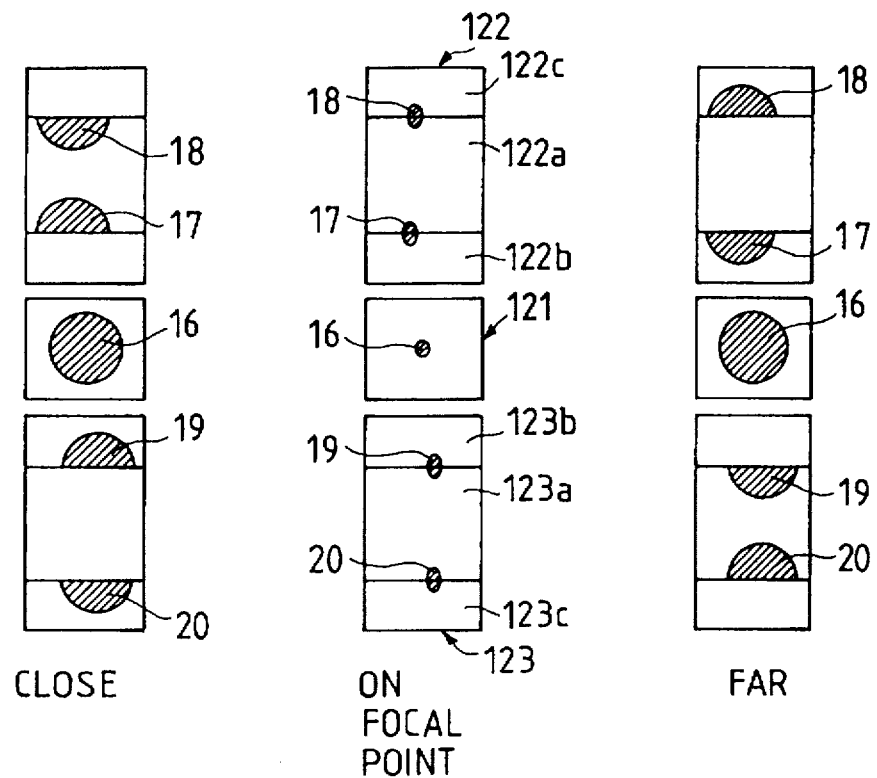
FIGS. 7 (a) to 7 (c) are diagrams illustrating states of light spots on a light receiving face of an optical detector in a second embodiment of the invention.

At the focal point, as shown in FIG. 7($b$), light spots 17 and 19 of first-order diffracted lights of the hologram pattern A, and light spots 18 and 20 of first-order diffracted lights of the hologram pattern B are positioned in the upper and lower sides with setting a light spot 16 of zero-order light as the center, and all the light spots are those of the minimum size. The light spot 16 is positioned at the center of the light detecting element 121, and the center of each of the light spots 17 to 20 of first-order diffracted lights is positioned on the split line of the corresponding 3-split light detecting elements 122 and 123 which are juxtaposed on the both sides of the light detecting element 121.

By contrast, when the distance between the objective lens 4 and the optical disk 5 is reduced, as shown in FIG. 7($a$), the light spot 16 of zero-order light is not changed in position but increased in diameter. The centers of the light spots 17 and 19 of first-order diffracted lights of the hologram pattern A are moved to the upper side in FIG. 7 while the spots are increased in size so as to have a shape similar to the opening shape of the hologram pattern A, and the centers of the light spots 18 and 20 of first-order diffracted lights of the hologram pattern B are moved to the lower side in FIG. 7 while the spots are increased in size so as to have a shape similar to the opening shape of the hologram pattern B. As a result, most portion of each of the light spots 17 to 20 of first-order diffracted lights is located in one side with respect to the corresponding split line of the 3-split light detecting elements 122 and 123. FIG. 7 shows an ideal state in which all portion of a light spot is located in one side. In practice, however, a portion of a light spot is caused to be located in the other side by blur or the like.

Conversely, when the distance between the objective lens 4 and the optical disk 5 is increased, as shown in FIG. 7($c$), the light spot 16 of zero-order light is not changed in position but increased in diameter. The centers of the light spots 17 and 19 of first-order diffracted lights of the hologram pattern A are moved to the lower side in FIG. 7 while the spots are increased in size so as to have a shape similar to the vertically inverted opening shape of the hologram pattern A. The centers of the light spots 18 and 20 of first-order diffracted lights of the hologram pattern B are moved to the upper side in FIG. 7 while the spots are increased in size so as to have a shape similar to the vertically inverted opening shape of the hologram pattern B.

With respect to the high frequency (RF) signal, in accordance with the degree of focusing, only the beam diameter of zero-order diffraction light is increased or decreased, and the light spot is always located on the light detecting element 121 of the optical detector. Since the light detecting element 121 has no split line, the effect due to the dead zone in the optical detector in the prior art example is never produced.

Figure 8:
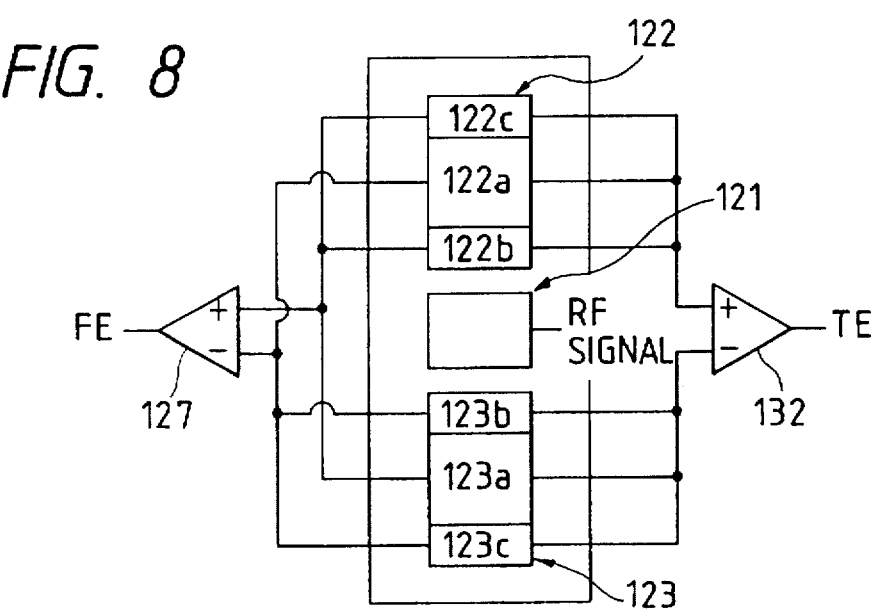
FIG. 8 is a diagram illustrating connections for obtaining an RF signal, an FE signal, a TE signal from outputs of light detecting elements of the optical detector in the second embodiment.

When the outputs of the light detecting element 121, and two 3-split elements 122 and 123 which constitute the optical detector are taken out as shown in FIG. 8, it is possible to obtain the focusing error (FE) signal and the tracking error (TE) signal. Namely, when the element pieces constituting the two 3-split elements 122 and 123 are 122$b$, 122$a$, and 122$c$, and 123$b$, 123$a$, and 123$c$, respectively, the outputs of the element pieces are connected so as to be compared by a comparator 127 as follows:

$$FE=(122b+122c+123a)-(123b+123c+122a)$$

As a result, the focusing error (FE) can be obtained. When the focusing error (FE) is obtained in this way, an effect due to a wavelength variation or a lens movement can be eliminated by conducting comparison in the same manner as the foregoing embodiment.

On the other hand, a tracking error (TE) in the positional relationship between the objective lens 4 and the optical disk 5 is detected in the strictly same manner as the conventional 3-beam method. With respect to the TE signal, as shown in FIG. 8, the outputs of the 3-split light detecting elements 122 and 123 are connected so as to be compared by a comparator 132 as follows:

$$TE=(122b+122c+122a)-(123b+123c+123a)$$

This allows the tracking error (TE) signal to be detected by obtaining the difference between the plus and minus first-order diffracted lights. It is possible to attain signal detection which is not affected by a wavelength variation or a lens movement as described above.

The 3-split light detecting elements 122 and 123 which are used in FIGS. 7 and 8 have a configuration in which the split element pieces of the 2-split light detecting element in FIG. 4 in the foregoing embodiment are integrated into one body. That is, the outputs of the adjacent split element pieces 22$b$ and 23$a$ of the 2-split light detecting elements 22 and 23 shown in FIGS. 4 and 5 in the foregoing embodiment are always handled so as to have the same polarity in the reading of information, the detection of a tracking error, and that of a focusing error, and then a sum of the outputs is obtained. In view of this, in the embodiment of FIGS. 7 and 8, the adjacent split element pieces 22b and 23a shown in FIGS. 4 and 5 are integrated into one body, thereby constituting a 3-split light detecting element. Accordingly, similar functions can be maintained by the 3-split light detecting element which is integrated into one body as described above. The above description is applicable also to the adjacent split element pieces 24b and 25a of the 2-split light detecting elements 24 and 25 shown in FIGS. 4 and 5.

As described above, in the embodiment of FIGS. 7 and 8, the split element pieces are adequately integrated into one body in accordance with synthesis and comparison states of the outputs of the light detecting elements. Therefore, signals for the reading of information, the detection of a tracking error, and that of a focusing error can be obtained by a minimum number of light detecting elements. The simple signal processing can be conducted by using only the minimum number of integrated light detecting elements. Therefore, the productivity and reliability of the device can be improved while maintaining the original functions.

Third embodiment

Next, a third embodiment of the invention will be described in detail with reference to FIGS. 9 to 11.

Figure 9:
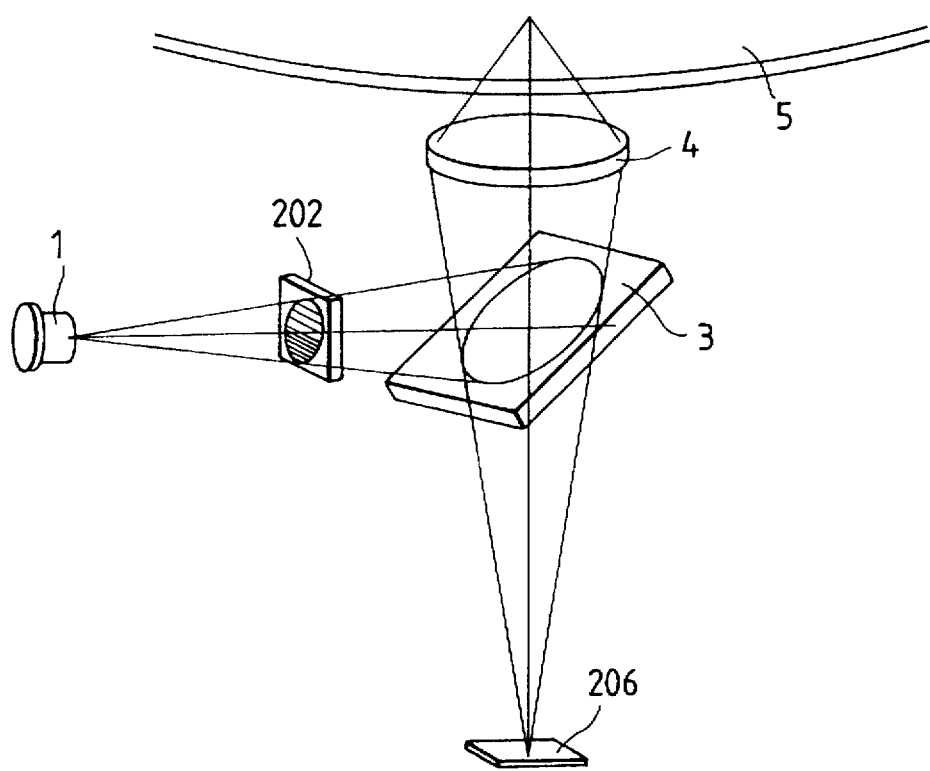
FIG. 9 is a diagram of a fundamental configuration of an optical pickup which is a third embodiment of the invention.
Figure 10A:
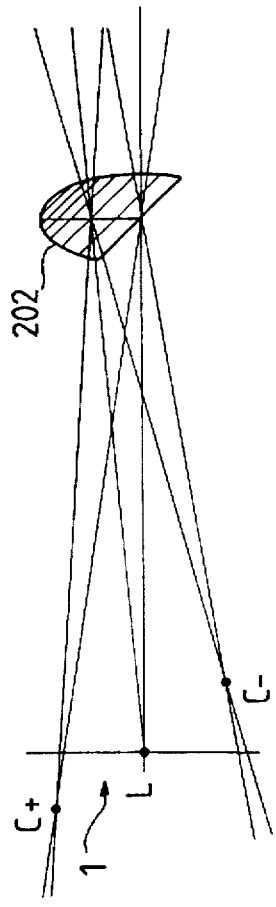
FIGS. 10 (a) and (b) are diagram illustrating the principle of an operation in which virtual images are formed by a hologram element used in the third embodiment.
Figure 10B:
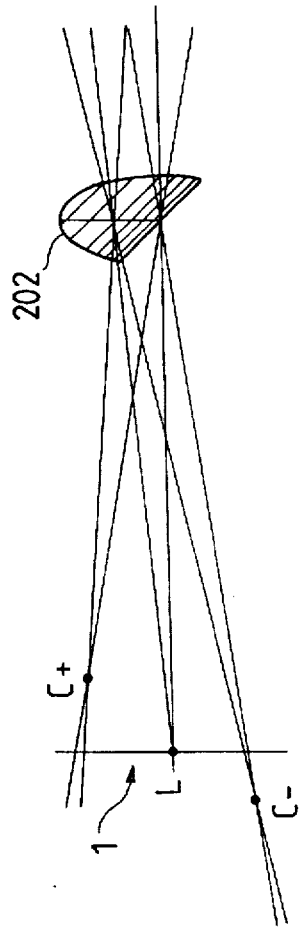

FIG. 9 is a diagram schematically showing the configuration of an optical pickup device which is a further embodiment of the invention. Light emitted from a semiconductor laser 1 which functions as a light source is split into plural light beams by a hologram element 202, and then converged in the form of plural light spots into the vicinity of a record face of an optical disk 5 by an objective lens 4 through a half-mirror 3. As shown in FIGS. 9, 11, 13, and 14, the hologram element 202 is split by a split line which elongates in a direction perpendicular to a track of a medium on the optical axis. In the same manner as the foregoing embodiments, the split line is shown as a phantom line. In the hologram elements other than the element of (e) of FIG. 11, the outlines of the upper and lower hologram patterns are symmetrical about the split line. In this way, the hologram element 202 has on at least one side of the split line, hologram patterns C and D which have a diffraction function directed along the track direction, and different diffraction conditions or different grating intervals and grating directions on both sides of the split line.

Figures 11A, 11B, 11C, 11D, 11E:
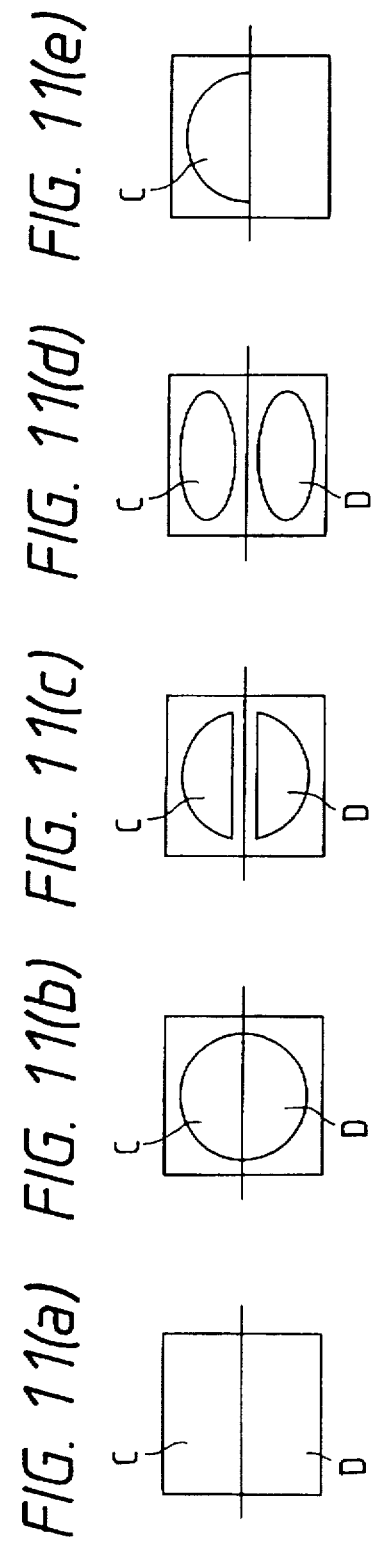
FIGS. 11 (a) to 11 (e) are diagrams illustrating a hologram pattern of the hologram element used in the third embodiment.

The hologram patterns C and D of the hologram element 202 of FIG. 11 are arranged in the following manner. In FIG. 11 (a), patterns having a rectangular shape are separated by the split line. In FIG. 11 (b), patterns having a semicircular shape the diameter of which is on the split line are disposed symmetrically about the split line. In FIG. 11 (c), the vicinity of the split line is formed as a region where no hologram pattern exists, and patterns having a substantially semicircular shape are disposed symmetrically about the split line. In FIG. 11 (d), the vicinity of the split line is formed as a region where no hologram pattern exists, and patterns having a substantially elliptical shape are disposed symmetrically about the split line. In FIG. 11 (e), only the hologram pattern C having a semicircular shape the diameter of which is on the split line is disposed.

Hereinafter, the hologram element having the hologram patterns of FIG. 11 (b) will be described. The effects described below can be attained also in the hologram elements having other hologram patterns such as those of FIGS. 11 (a), (c), (d), and (e).

In a specific example of the hologram pattern, the modulation is very small in degree as compared with the fundamental grating interval, or is done so that, when the fundamental grating interval of the grating C is 30 µm and the grating has 30 elements, the difference at the both ends is slightly decreased or increased by 1 µm, and that, when the fundamental grating interval of the grating D is 60 µm and the grating has 30 elements, the difference at the both ends is slightly decreased or increased by 2 µm. If the grating is shown in the figures as it is, the modulation cannot appear in the figures. In FIGS. 9, 10, and 13, therefore, the modulation is emphasized so as to be easily understood. The difference in grating direction of the hologram patterns C and D is several degrees or less. If the grating is shown in the figures as it is, the grating direction difference cannot appear in the figures. In the same manner as the modulation, therefore, the grating direction difference is shown with being emphasized.

The fundamental grating interval and degree of modulation of the grating can adequately be set in accordance with conditions such as the arrangement of the light detecting elements, the controllable range of the focus and the like, and the relationships between positional deviation and the output gains of the light detecting elements (the relationships between the allowable performance of the optical pickup device and the easiness of adjustment).

The positions where a virtual image of first-order diffracted lights is formed by the function of the hologram pattern in which the grating interval is modulated will be described specifically with reference to a diagram shown in FIG. 10 (a) and (b) illustrating the principle. In the hologram pattern of FIG. 10 (a), the grating interval is modulated so that, as moved more upward in the figure, the grating interval is made smaller as compared with the fundamental grating interval.

In a meridional plane, therefore, with respect to the light beam emitted from a semiconductor laser L, the diffraction angle at a portion remote from the optical axis is greater than that at a portion in the vicinity of the optical axis, so that first-order diffracted lights form virtual images C+ and C− at points which are point-symmetrical about the position L of the semiconductor laser and separated from each other in the optical axis direction. In the hologram pattern of FIG. 10(b), the grating interval is modulated so that, as moved nearer to the optical axis, the grating interval is made smaller. Therefore, virtual images C+ and C− are formed at positions which are opposite to those of FIG. 10(a) about the optical axis.

The focal points of the virtual images in a sagittal direction exist in a section which is perpendicular to the optical axis passing through the semiconductor laser L.

In the hologram element, the modulation hologram patterns having a semicircular shape can be combined in the upper and lower sides of the split line in one of the manners shown in FIG. 13. In each of the combinations shown in FIG. 13, the fundamental grating interval of the upper hologram pattern C is larger than that of the corresponding lower hologram pattern D. With respect to the upper hologram pattern C, in FIG. 13 (a) and FIG. 13 (c), the grating interval is modulated so that, as moved more upward in the figure, the grating interval is made smaller, and, in FIG. 13 (b) and FIG. 13 (d), the grating interval is modulated so that, as moved more downward in the figure, the grating interval is made smaller. On the other hand, with respect to the lower hologram pattern D, in FIGS. 13 (a) and (d), the grating interval is modulated so that, as moved more downward in the figure, the grating interval is made smaller, and, in FIGS.

13 (b) and (c), the grating interval is modulated so that, as moved more upward in the figure, the grating interval is made smaller. Hereinafter, the combination of FIG. 13(a) will be described in detail.

Figure 14:
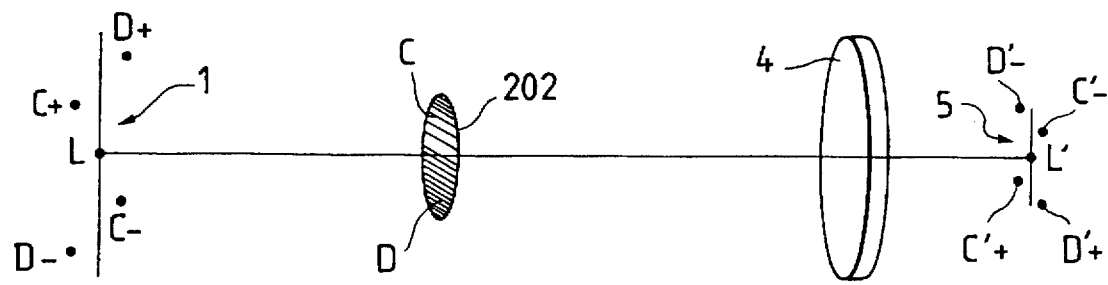
FIG. 14 is a diagram illustrating the principle of an operation in which light beams are converged on the vicinity of a record face of a disk by a hologram element used in the third embodiment.

Light spots which are converged on the record face of an optical disk by the function of the hologram element will be described with reference to FIG. 14. In order to illustrate the relationships between the focal points of the light spots in the optical axis direction, for the sake of convenience, the positions of the light spots as seen in a direction perpendicular to the optical axis are shown in FIG. 14 in the same manner as FIG. 2 of the foregoing embodiment.

In the figure, the hologram patterns C and D are different in fundamental grating interval and equal in degree of modulation. The position of a light spot is changed by changing the fundamental grating interval, and astigmatism is produced in a meridional plane by modulating the grating interval of the hologram pattern. Among light beams which are emitted from the semiconductor laser 1 (L) and enter the upper hologram pattern C of FIG. 14, zero-order light which has undergone no diffraction passes through the hologram pattern C and enters the objective lens 4 to be converged on a point L'. First-order lights which have undergone diffraction enter the objective lens 4 as if the light source is positioned at virtual images C+ and C− which are point-symmetrical about the position L of the semiconductor laser, and are then converged on points C'+ and C'− in the vicinity of the disk 5.

In other words, light beams emitted from the hologram pattern C are converged by the objective lens 4 on the corresponding positions (conjugates) of the record face, respectively, in the following manner. Zero-order light is converged on the point L' which is the conjugate of the position L. In a sagittal plane, first-order diffracted lights are converged in the same conjugate plane as zero-order light, and, in a meridional plane, converged on the points C'+ and C' which are the conjugates of C+ and C−. The points C'+ and C'− are shifted with respect to the disk 5 in the back and forth directions by the function of the modulation grating.

The same description as the above is applied also to the light beams which are emitted from the semiconductor laser 1 and enter the lower hologram pattern D shown in FIG. 6. Namely, zero-order light is converged on the point L' which is the conjugate of the position L, and first-order diffracted lights are converged on points D'+ and D'− which are the conjugates of D+ and D−. The light beams are converged in the vicinity of the disk 5.

Consequently, light emitted from the semiconductor laser is formed into light beams of zero-order and first-order diffracted lights by the functions of the upper and lower hologram patterns C and D of the hologram element 202, and then passes through the objective lens 4 to be converged as the five light spots L', C'+, C'−, D'+, and D'− in the vicinity of the record face of the optical disk 5. Since the hologram patterns C and D are equal to each other in degree of modulation, the distances in the optical axis direction between the points C'+ and D'−, and C'− and D'+ with respect to the face of the disk 5 are coincident with each other.

The optical spots as seen in a direction perpendicular to the record face of the optical disk 5 are shown in FIG. 12. A light spot 210 which is positioned at the center of a track 215 is formed by zero-order diffracted light, and other four spots are formed by plus and minus first-order diffracted lights. A light beam which has passed through the region of the hologram element 202 where no hologram pattern is disposed is converged on the same light spot as that of zero-order diffracted light.

In this case, light spots 211 and 213 of first-order diffracted lights of the hologram pattern C are located at positions which are point-symmetrical about the center light spot 210, and also light spots 212 and 214 of first-order diffracted lights of the hologram pattern D are located at positions which are point-symmetrical about the center light spot 210. With respect to these spots, first-order diffracted lights of the hologram patterns C and D can be converged on adequate positions of a track by selecting the grating intervals and grating directions of the hologram patterns C and D. A diagrammatic shape of a light spot of such first-order diffracted light is obtained as a defocused image of the Fourier transform of the opening shape of the corresponding hologram pattern.

Next, light spots on an optical detector 206 will be described. As shown in FIG. 9, the light spots on the record face of the optical disk 5 are reflected from the optical disk 5, and the reflected light beams again pass through the objective lens 4 and are again formed into light spots on the focal plane on the side of the optical detector 206. The positional relationships of the light spots on the focal plane on the side of the optical detector 206 are conjugated with those of the light spots on the record face. When the positional relationship between the objective lens 4 and the optical disk 5 is moved in the direction of the optical axis or a direction perpendicular to the optical axis, therefore, the positions and shapes of the spots are changed in the same manner on both the record face and the focal plane on the side of the optical detector. The change of the positional relationship between the objective lens 4 and the optical disk 5 in the direction of the optical axis, i.e., the change of a light spot on the optical detector 206 which is caused by a focusing error will be described with reference to FIGS. 15 and 16.

Figure 15:
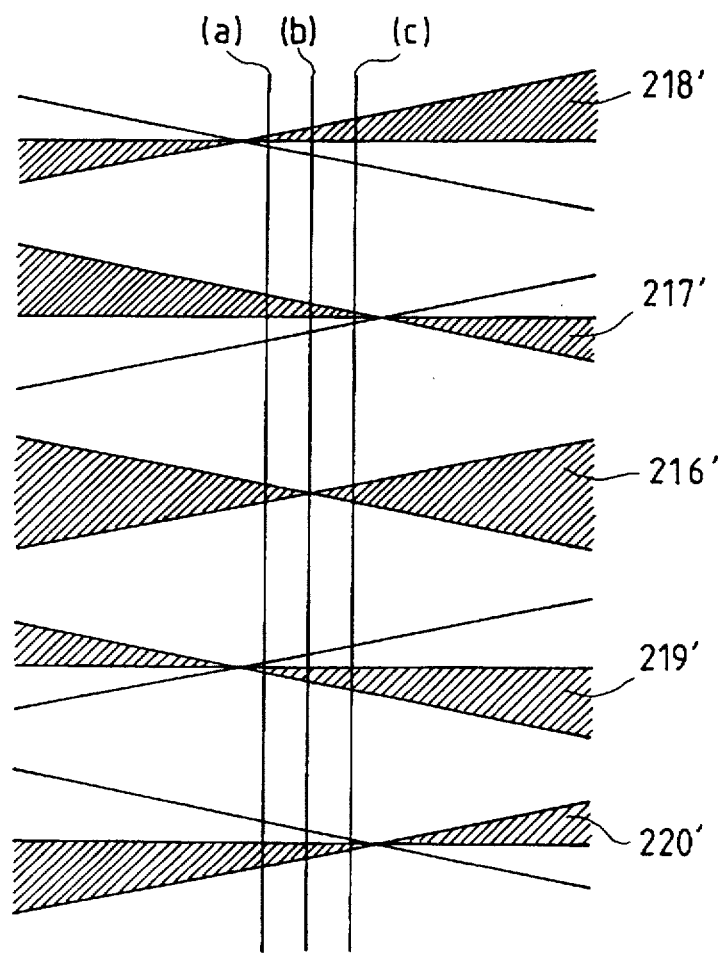
FIG. 15 is a diagram illustrating converged light beams in a meridional plane in the vicinity of a light detecting element in the third embodiment.

In FIG. 15, (b) indicates the focused state, (a) indicates a state in which the objective lens 4 is close to the optical disk 5, and (c) indicates a state in which the objective lens 4 is remote from the optical disk 5. FIG. 15 shows the shapes a light beam 216' of zero-order light, first-order diffracted light beams 217' and 219' of the hologram pattern C, and first-order diffracted light beams 218' and 220' of the hologram pattern D, in the vicinity of the optical detector 206 and in a meridional plane. FIG. 16 shows the light spots of the beams on the light detecting elements.

The optical detector 206 comprises a light detecting element 221 which has no split line, and 2-split light detecting elements 222a and 222b to 225a and 225b each of which is split into upper and lower regions a and b by a split line.

Figures 16A, 16B, 16C:
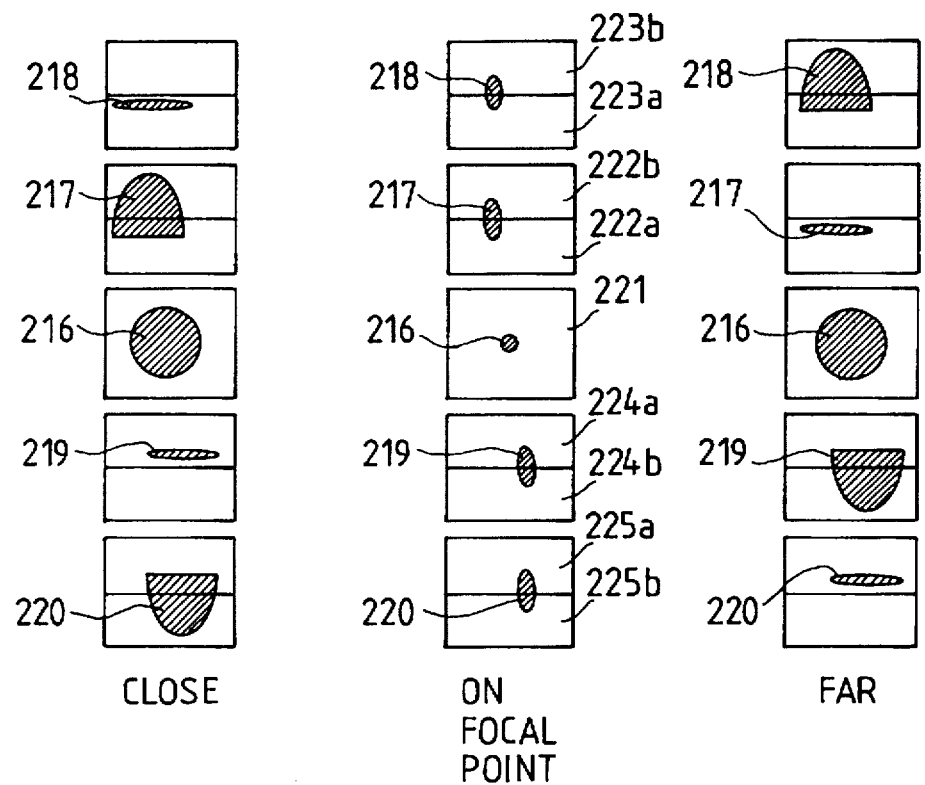
FIGS. 16 (a) to 16 (c) are diagrams illustrating states of light spots on a light receiving face of the optical detector in the third embodiment.

At the focal point, as shown in FIG. 16(b), light spots 217 and 219 of first-order diffracted lights of the hologram pattern C, and light spots 218 and 220 of first-order first-order diffracted lights of the hologram pattern D are positioned in the upper and lower sides with setting a light spot 216 of zero-order light as the center, and all the light spots are those of a minimum size formed in a substantially sagittal direction (a direction perpendicular to the track). With respect to the light spots 217 to 220, as described above, astigmatism is produced in a meridional plane by modulating the grating interval of the hologram pattern. Accordingly, an elliptical light spot which elongates in the track direction is formed on each light detecting element of FIG. 16.

The light spot 216 is positioned at the center of the light detecting element 221, and the centers of the light spots 217 to 220 of first-order diffracted lights are positioned on the split lines of the corresponding 2-split light detecting elements 222a and 222b to 225a and 225b which are aligned on the both sides of the light detecting element 221.

By contrast, when the distance between the objective lens 4 and the optical disk 5 is reduced, as shown in FIG. 16(a), the light spot 216 of zero-order light is not changed in position but increased in diameter, and the center of the light spot 217 of first-order diffracted light of the hologram pattern C is moved to the upper side in FIG. 16 while the spot is increased in size so as to have a shape similar to the opening shape of the hologram pattern C, in accordance with the principle same as that of the Foucault method. The center of the light spot 219 of first-order diffracted light of the hologram pattern C is moved to the upper side in FIG. 16 while the spot is decreased in size in a meridional direction and increased in a sagittal direction. On the other hand, the center of the light spot 218 of first-order diffracted light of the hologram pattern D is moved to the lower side in FIG. 16 while the spot is decreased in size in a meridional direction and increased in a sagittal direction, and the center of the light spot 220 of first-order diffracted light of the hologram pattern D is moved to the lower side in FIG. 16 while the spot is increased in size so as to have a shape similar to the opening shape of the hologram pattern D. As a result, most portion of each of the light spots 217 to 220 of first-order diffracted lights is located in one side with respect to the corresponding split line of the 2-split light detecting elements 222a and 222b to 225a and 225b. FIG. 16 shows an ideal state in which all portion of a light spot is located in one side. In practice, however, a portion of a light spot is caused to be located in the other side by blur or the like.

Conversely, when the distance between the objective lens 4 and the optical disk 5 is increased, as shown in FIG. 16(c), the light spot 216 of zero-order light is not changed in position but increased in diameter, and the center of the light spot 217 of first-order diffracted light of the hologram pattern C is moved to the lower side in FIG. 16 while the spot is decreased in size in a meridional direction and increased in a sagittal direction, in accordance with the principle same as that of the Foucault method. The center of the light spot 219 of first-order diffracted light of the hologram pattern C is moved to the lower side in FIG. 16 while the spot is increased in size so as to have a shape similar to the opening shape of the hologram pattern C. On the other hand, the center of the light spot 218 of first-order diffracted light of the hologram pattern D is moved to the upper side in FIG. 16 while the spot is increased in size so as to have a shape similar to the opening shape of the hologram pattern D, and the center of the light spot 220 of first-order diffracted light of the hologram pattern D is moved to the upper side in FIG. 16 while the spot is decreased in size in a meridional direction and increased in a sagittal direction.

With respect to the high frequency (RF) signal, therefore, in accordance with the degree of focusing, only the beam diameter of zero-order diffraction light is increased or decreased, and the light spot is always located on the light detecting element 221 of the optical detector 6. Since the light detecting element 221 has no split line, the effect due to the dead zone in the optical detector in the prior art example is never produced.

When the grating interval of the hologram element is not modulated, the first-order light spots 217 to 220 in FIG. 16(b) are formed as points having a minute area, and hence it is cumbersome to make the split lines of the 2-split light detecting elements 222a and 222b to 225a and 225b coincide with the centers of the light spots 217 to 220. In the embodiment, the light spots are elongated in the track direction to have an elliptical shape as a result of the modulation of the grating interval. In the positional adjustment in which the split lines of the 2-split light detecting elements 222a and 222b to 225a and 225b are made coincide with the centers of the light spots 217 to 220, therefore, the allowable range of the adjustment is widened as compared with the case where the grating interval is not modulated, and hence the arrangement and positions of the 2-split light detecting elements can easily be conducted.

In the above, the hologram element of FIG. 13 (a) has been described. In the other hologram elements of FIGS. 13 (b), (c), and (d), the converging positions in a meridional plane are different, and hence the shapes of the light spots which are formed by focusing on the optical detector are changed in accordance with the respective positions. However, the movement of the light spots is changed in the same manner as described above.

Figure 17:
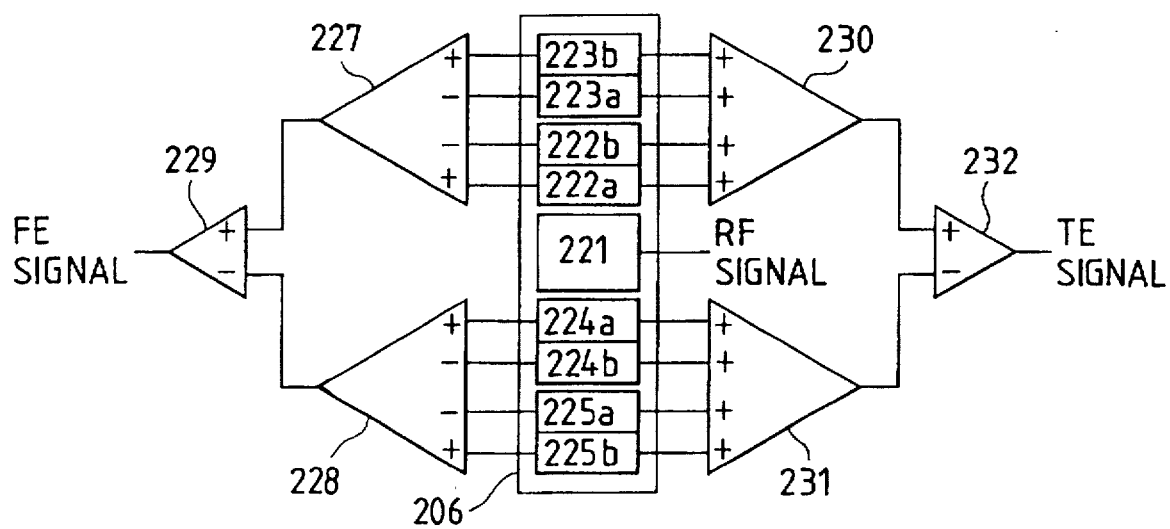
FIG. 17 is a diagram illustrating connections for obtaining an RF signal, an FE signal, a TE signal from outputs of light detecting elements of the optical detector in the third embodiment.

Therefore, the focusing error (FE) signal is obtained by connecting the outputs of the light detecting elements 222a and 222b to 225a and 225b of the optical detector 206 in the following manner. As shown in FIG. 17, the outputs of the 2-split light detecting elements 222a and 222b, and 223a and 223b, and those of the 2-split light detecting elements 224a and 224b, and 225a and 225b are compared by comparators 227 and 228 in a vertically inverted manner, and the comparison results are compared by a comparator 229. Therefore, an effect due to a wavelength variation or a lens movement can be eliminated in the same manner as the foregoing embodiments.

On the other hand, the tracking error (TE) signal in the tracking direction of the positional relationship between the objective lens 4 and the optical disk 5 is detected in the strictly same manner as the conventional 3-beam method. Namely, connection is conducted in the following manner. As shown in FIG. 17, the outputs of the 2-split light detecting elements 222a and 222b, and 223a and 223b, and those of the 2-split light detecting elements 224a and 224b, and 225a and 225b are added by adders 230 and 231, and the addition results are compared by a comparator 232, thereby obtaining the difference between the plus and minus first-order diffracted lights.

Alternatively, the tracking error (TE) signal may be obtained from only a suitable combination of the outputs of the 2-split light detecting elements 222a and 222b, and 224a and 224b, or the 2-split light detecting elements 223a and 223b, and 225a and 225b.

In the hologram element 202 shown in (FIG. 11 (e), only the hologram pattern C is disposed so that the light spots 218 and 220 are not formed. Also in this case, however, the jitter characteristics of the high frequency (RF) signal and the focusing error (FE) signal can be improved in the same manner as described above. Since the light detecting elements 223 and 225 are not required, the configuration of the light detecting elements can be simplified.

fourth embodiment

Next, a fourth embodiment of the invention will be described in detail with reference to FIGS. 18 to 23.

Figure 18:
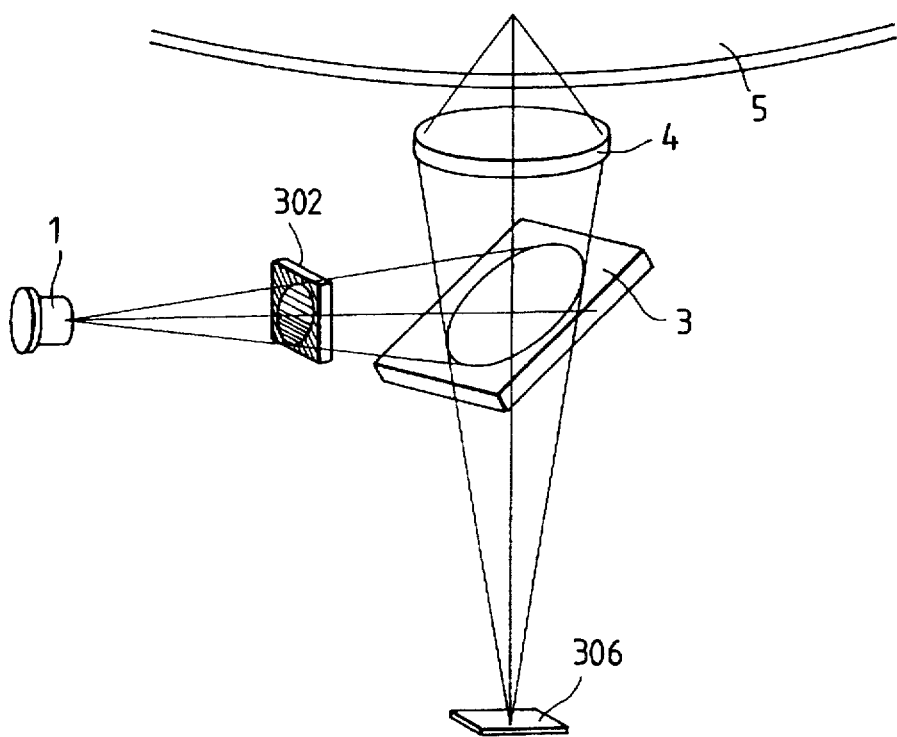
FIG. 18 is a diagram of a fundamental configuration of an optical pickup which is a fourth embodiment of the invention.

FIG. 18 is a diagram schematically showing the configuration of an optical pickup device which is the fourth embodiment of the invention, and which, in addition to a first hologram pattern region that is described above and, uses a second hologram pattern region that splits three beams for detecting a high frequency (RF) signal. Light emitted from a semiconductor laser 1 which functions as a light source is split into plural light beams by a hologram element 302, and then converged into the form of plural light spots in the vicinity of a record face of an optical disk 5 by an objective lens 4.

Figure 19:
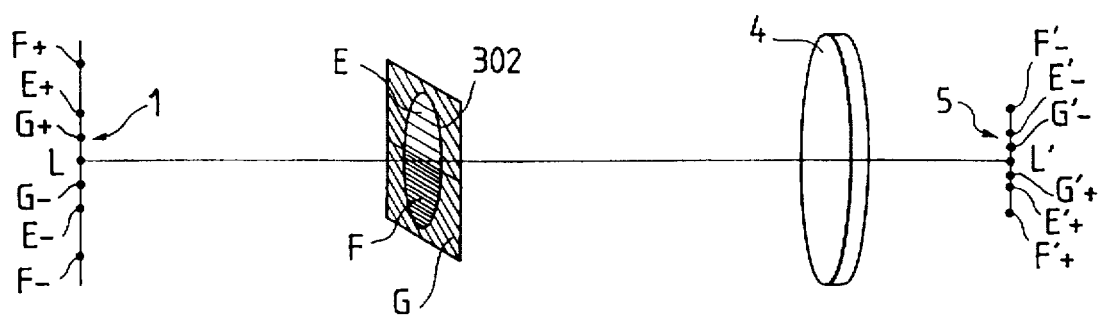
FIG. 19 is a diagram illustrating the principle of an operation in which light beams are converged on a record face of a disk by a hologram element used in the fourth embodiment.
Figures 23A, 23B, 23C, 23D:
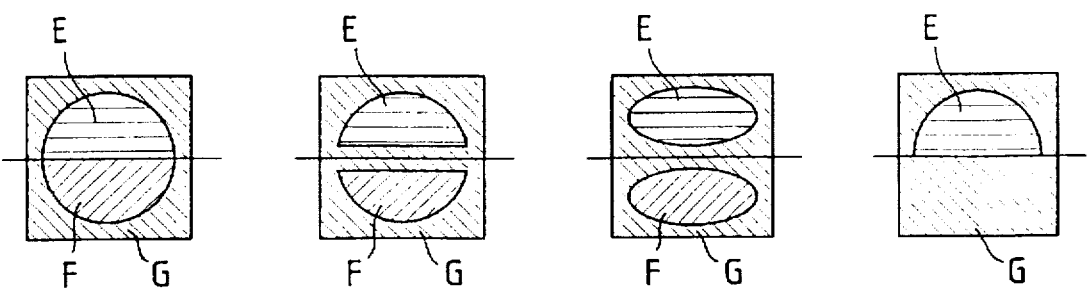
FIGS. 23 (a) to 23 (d) are diagrams illustrating a hologram pattern of a hologram element used in the fourth embodiment.
Figure 24:
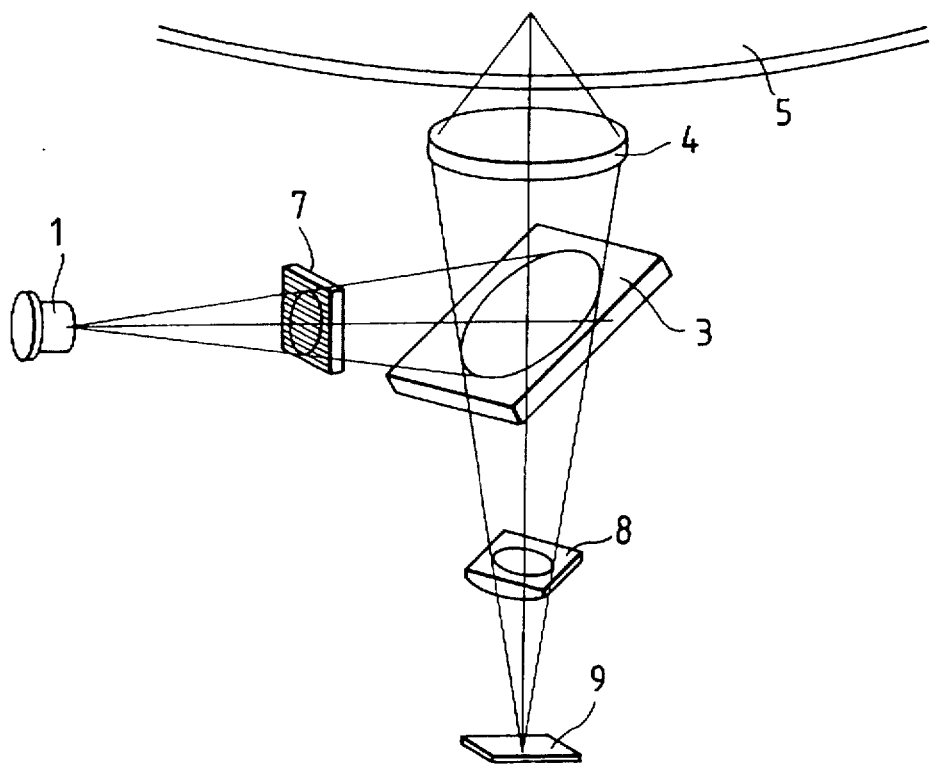
FIG. 24 is a diagram of a fundamental configuration of an optical pickup which is a prior art example.
Figure 25:
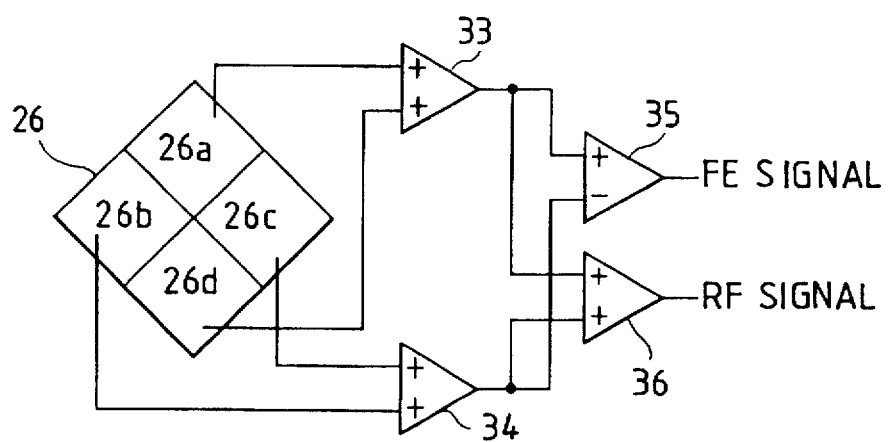
FIG. 25 is a diagram illustrating connections of outputs of a 4-split light detecting element used in the prior art example.

As shown in FIGS. 18, 19, and 23, the hologram element 302 is split by a split line which elongates in a direction perpendicular to a track of a medium on the optical axis. The diffraction conditions are different on both sides of the split line. At least one side of the split line consists of a first hologram pattern region having a diffraction function directed in the track direction, and a second hologram pattern region which occupies the area other than the first hologram pattern region. The diffraction conditions are different in the regions. The other side of the split line consists of a first hologram pattern region and a second hologram pattern region, or one hologram pattern region having the same conditions as the second hologram pattern region. The first hologram pattern region comprises hologram patterns E and F in which the interval and direction of the grating are different in the both sides of the split line. The other portion is configured as a hologram pattern G which is common to the both sides.

In the hologram element 302 shown in FIG. 23, the hologram patterns E, F, and G are arranged in the following manner. In FIG. 23 (a), hologram patterns E and F having a semicircular shape the diameter of which is on the split line are disposed, and a hologram pattern G is disposed outside the patterns. In FIG. 23 (b), substantially semicircular hologram patterns E and F are disposed at positions separated from the split line, and the remaining portion including the vicinity of the split line and other than the hologram patterns E and F is configured as a hologram pattern G. In FIG. 23 (c), substantially elliptic hologram patterns E and F are disposed at positions separated from the split line, and the remaining portion including the vicinity of the split line and other than the hologram patterns E and F is configured as a hologram pattern G. In FIG. 23 (d), a semicircular hologram pattern E the diameter of which is on the split line is disposed, and the portion other than the hologram pattern E is configured as a hologram pattern G. The hologram patterns E and F may be the same as the hologram patterns A and B or the hologram patterns C and D which are used in the foregoing embodiments.

The relationships between the hologram patterns and light beams are set so that, as shown in FIG. 18, the light beams are larger than the hologram patterns E and F, and the outer periphery of the light beams has a size substantially equal to the outer boundary of the hologram pattern G surrounding the hologram patterns E and F. In the cases of FIG. 23 (b) and (c), the outer periphery of the hologram patterns E and F may be made coincide with that of the light beams.

Hereinafter, the hologram element having the hologram patterns of FIG. 23 (a) will be described. The effects described below can be attained also in the hologram elements having other hologram patterns such as those of FIG. 23 (b), (c), and (d). First, the positions where beams of zero-order diffracted light and first-order diffracted lights are converged by the function of the first region for detecting tracking and focusing error signals in the hologram element 302 will be described with reference to a diagram of FIG. 19 illustrating the principle. In order to illustrate the relationships between the focal points of the light spots in the optical axis direction, for the sake of convenience, the positions of the light spots as seen in a direction perpendicular to the optical axis are shown in FIG. 19 in the same manner as FIGS. 2 and 14 of the foregoing embodiments.

Among light beams which are emitted from the semiconductor laser 1 and enter the upper hologram pattern E of the first region of FIG. 19, zero-order light which has undergone no diffraction passes through the hologram pattern E and enters the objective lens 4 to be converged on a point L'. First-order diffracted lights which have undergone diffraction enter the objective lens 4 as if the light source is positioned at virtual images E+ and E− which are optical axis-symmetrical about the position L of the semiconductor laser 1, and are then converged on points E'+ and E'−. In other words, light beams emitted from the hologram pattern E are converged by the objective lens 4 on the corresponding positions (conjugates) of the record face, respectively. Specifically, zero-order light is converged on the point L' which is the conjugate of the position L, and first-order lights are converged on the points E'+ and E'− which are the conjugates of E+ and E−.

The same description as the above is applied also to the light beams which are emitted from the semiconductor laser and enter the lower hologram pattern F of the first region shown in FIG. 19. Namely, zero-order light is converged on the point L' which is the conjugate of the position L, and first-order lights are converged on points F'+ and F'− which are the conjugates of F+ and F−.

Next, the function of the hologram pattern G of the second region of the hologram element 302 will be described.

Among light beams which are emitted from the semiconductor laser 1 and enter the hologram pattern G of the second region of FIG. 19, zero-order light which has undergone no diffraction passes through the hologram pattern G and enters the objective lens 4 to be converged on a point L'. First-order diffracted lights which have undergone diffraction enter the objective lens 4 as if the light source is positioned at virtual images G+ and G− which are optical axis-symmetrical about the position L of the semiconductor laser 1, and are then converged on points G'+ and G'−. In other words, light beams emitted from the hologram pattern G are converged by the objective lens 4 on the corresponding positions (conjugates) of the record face, respectively. Specifically, zero-order light is converged on the point L' which is the conjugate of the position L, and first-order lights are converged on the points G'+ and G'− which are the conjugates of G+ and G−.

Therefore, light emitted from the semiconductor laser is converted into zero-order diffracted light and first-order diffracted lights by the functions of the upper and lower hologram patterns E and F of the first region of the hologram element 302, and the hologram pattern G of the second region. After passing through the objective lens 4, the light beams are converged as the seven light spots L', G'+, G'−, E'+, E'−, F'+, and F'− on the record face of the optical disk 5.

Figure 20:
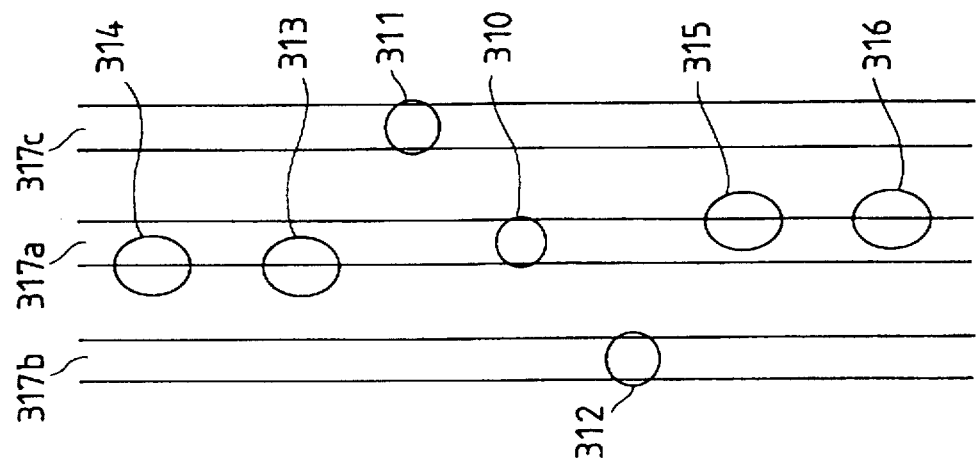
FIG. 20 is a diagram illustrating irradiation states of seven spots on a face of an optical disk in the fourth embodiment.

The optical spots as seen in a direction perpendicular to the record face of the optical disk 5 are shown in FIG. 20. A light spot 310 which is positioned at the center of a track 317a is formed by zero-order diffracted light. Four spots 313, 314, 315, and 316 are formed by plus and minus first-order diffracted lights due to the diffraction function of the first hologram pattern region of the hologram element, and two spots 311 and 312 are formed by plus and minus first-order diffracted lights due to the diffraction function of the second hologram pattern region of the hologram element.

In this case, the light spots 313 and 315 of first-order diffracted lights of the hologram pattern E are located at positions which are point-symmetrical about the center light spot 310, and also the light spots 314 and 316 of first-order diffracted lights of the hologram pattern F are located at positions which are point-symmetrical about the center light spot 310. With respect to these spots, first-order diffracted lights of the hologram patterns E and F can be converged on adequate positions of a track by selecting the grating intervals and grating directions of the hologram patterns E and F. Similarly, the light spots 311 and 312 of first-order diffracted lights of the hologram pattern G are located at positions which are point-symmetrical about the center light spot 310. The light spots 311 and 312 can be converged by adequately selecting the grating intervals and grating directions of the second hologram pattern of the hologram element, on tracks 317b and 317c which is not the track 317a irradiated with the zero-order light spot 310 or adjacent to the track 317a.

A diagrammatic shape of a light spot of such first-order diffracted light is obtained by conducting the Fourier transform on the opening shape of the corresponding hologram pattern.

Next, light spots on an optical detector 306 will be described. The light spots on the record face of the optical disk 5 are reflected from the optical disk 5, and the reflected light beams again pass through the objective lens 4 and are again formed into light spots on the focal plane on the side of the optical detector 306. The positional relationships of the light spots on the focal plane on the side of the optical detector 306 are conjugated with those of the light spots on the record face. When the positional relationship between the objective lens 4 and the optical disk 5 is moved in the direction of the optical axis or a direction perpendicular to the optical axis, therefore, the positions and shapes of the spots are changed in the same manner on both the record face and the focal plane on the side of the optical detector. The change of the positional relationship between the objective lens 4 and the optical disk 5 in the direction of the optical axis, i.e., the change of a light spot on the optical detector 306 which is caused by a focusing error will be described with reference to FIG. 21.

The optical detector 306 is configured by three light detecting elements 325, 326, and 327 having no split line, and the light detecting elements 328a and 328b to 331a and 331b which are split by the split line into two portions in the upper and lower regions a and b.

Figures 21A, 21B, 21C:
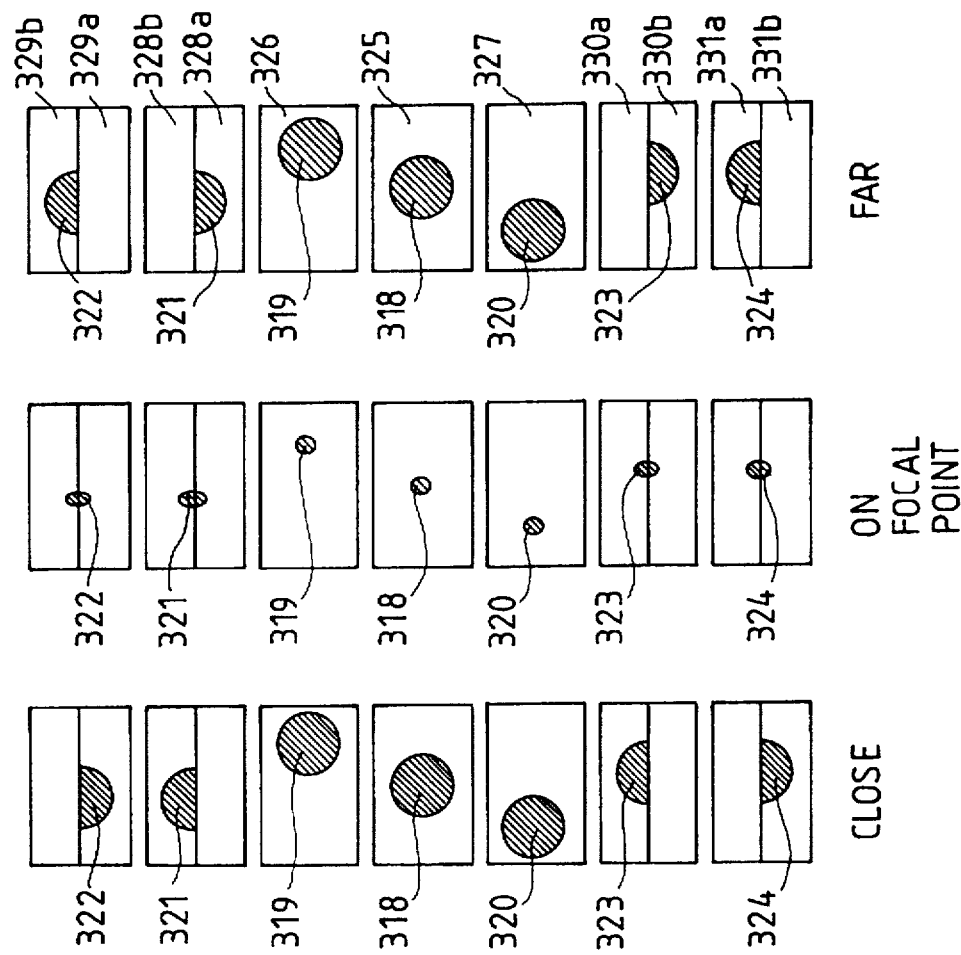
FIGS. 21 (a) to 21 (c) are diagrams illustrating states of light spots on a light receiving face of an optical detector in the fourth embodiment.

At the focal point, as shown in FIG. 21(b), light spots 319 and 320 of first-order diffracted lights of the hologram pattern G are positioned in the upper and lower sides with setting a light spot 318 of zero-order light as the center, and all the light spots are those of a minimum size. The light spot 318 is positioned at the center of the light detecting element 325, and the light spots 319 and 320 are positioned on the corresponding 2-split light detecting elements 326 and 327 which are aligned on the both sides of the light detecting element 325.

Furthermore, at the focal point, light spots 321 and 323 of first-order diffracted lights of the hologram pattern E, and light spots 322 and 324 of first-order diffracted lights of the hologram pattern F are positioned in the upper and lower sides, and all the light spots are those of a minimum size. The light spot 318 is positioned at the center of the light detecting element 325, and the light spots 321 to 324 are positioned on the split line of the corresponding 2-split light detecting elements 328a and 328b to 331a and 331b which are aligned on the both sides of the light detecting element 325.

By contrast, when the distance between the objective lens 4 and the optical disk 5 is reduced, as shown in FIG. 21(a), the light spot 318 of zero-order light, and the light spots 319 and 320 of first-order diffracted lights of the hologram pattern G are not changed in position but increased in diameter, and the centers of the light spots 321 and 323 of first-order diffracted light of the hologram pattern E are moved to the upper side in FIG. 21 while the spots are increased in size so as to have a shape similar to the opening shape of the hologram pattern E, in accordance with the principle same as that of the Foucault method. The centers of the light spots 322 and 324 of first-order diffracted light of the hologram pattern F are moved to the lower side in FIG. 21 while the spots are increased in size so as to have a shape similar to the opening shape of the hologram pattern F. As a result, most portion of each of the light spots 321 to 324 is located in one side of the 2-split light detecting elements 328a and 328b to 331a and 331b. FIG. 21 shows an ideal state in which all portion of a light spot is located in one side. In practice, however, a portion of a light spot is caused to be located in the other side by blur or the like.

Conversely, when the distance between the objective lens 4 and the optical disk 5 is increased, as shown in FIG. 21(c), the light spot 318 of zero-order light, and the light spots 319 and 320 of first-order diffracted lights of the hologram pattern G are not changed in position but increased in diameter, and the centers of the light spots 321 and 323 of first-order diffracted light of the hologram pattern E are moved to the lower side in FIG. 21 while the spots are increased in size so as to have a shape similar to the vertically inverted opening shape of the hologram pattern E, in accordance with the principle same as that of the Foucault method. The centers of the light spots 322 and 324 of first-order diffracted light of the hologram pattern F are moved to the upper side in FIG. 21 while the spots are increased in size so as to have a shape similar to the vertically inverted opening shape of the hologram pattern F.

Therefore, high frequency (RF) signals of three tracks are independently obtained from the outputs of the light detecting elements 325, 326, and 327, and these signals are simultaneously obtained from the three tracks. Since the RF signals are obtained from the light detecting elements 325, 326, and 327 which have no split line, the effect due to the dead zone in the 4-split optical detector in the prior art example can be eliminated.

In other words, according to the optical pickup device of the embodiment, information of three tracks can simultaneously be read out, and hence the reading time can be shortened to a fraction of that in the prior art. Since only one light source is used, the configuration and adjustment can be simplified. In other words, signal detection in which, even when the spot diameter of an output signal is changed or the spot position is moved, the level of the output signal is prevented from being changed and excellent jitter characteristics are attained can be conducted.

Figure 22:
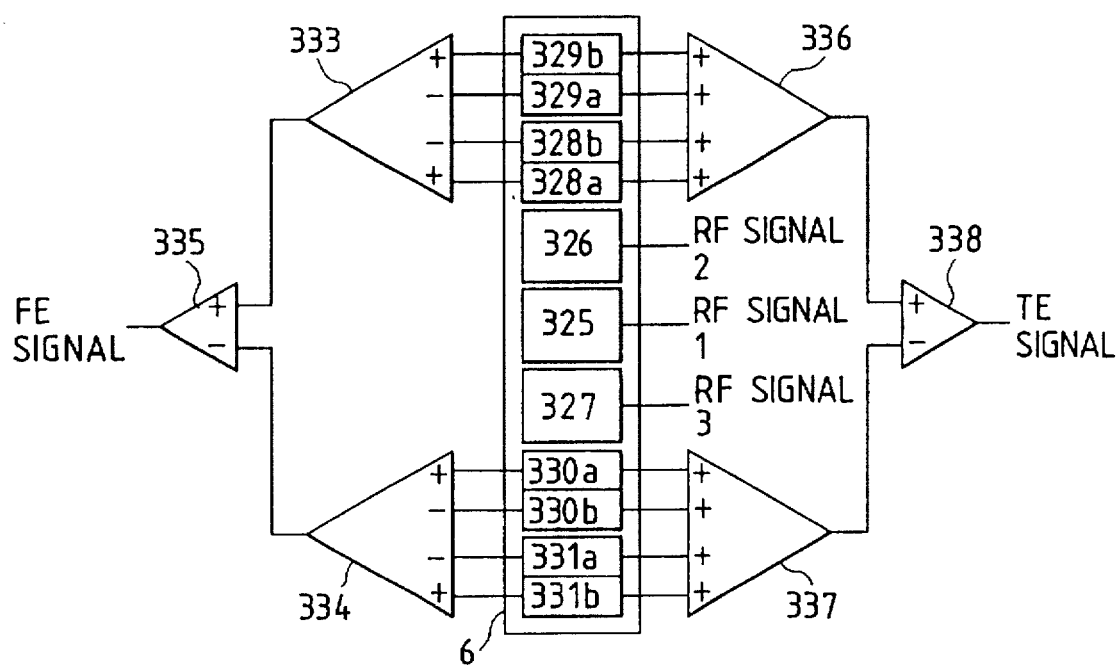
FIG. 22 is a diagram illustrating connections for obtaining an RF signal, an FE signal, a TE signal from outputs of light detecting elements of the optical detector in the fourth embodiment.

Therefore, the focusing error (FE) signal is obtained by connecting the outputs of the light detecting elements 328a and 328b to 331a and 331b of the optical detector 306 in the following manner. As shown in FIG. 22, the outputs of the 2-split light detecting elements 328a and 328b, and 329a and 329b, and those of the 2-split light detecting elements 330a and 330b, and 331a and 331b are compared by comparators 333 and 334 in a vertically inverted manner, and the comparison results are compared by a comparator 335. When the focusing error (FE) is obtained in this way, the following effect can be attained. As described in the first embodiment, namely, signal detection in which, even when the frequency of emitted light is varied or the spot position is moved, the level of the output signal is prevented from being changed and excellent jitter characteristics are attained can be conducted.

The tracking error (TE) signal in the tracking direction of the positional relationship between the objective lens 4 and the optical disk 5 is detected in the strictly same manner as the conventional 3-beam method. Namely, connection is conducted in the following manner. As shown in FIG. 22, the outputs of the 2-split light detecting elements 328a and 328b, and 329a and 329b, and those of the 2-split light detecting elements 330a and 330b, and 331a and 331b are added by adders 336 and 337, and the addition results are compared by a comparator 338. As a result, the tracking error (TE) signal can be obtained as the difference between the plus and minus first-order diffracted lights, and signal detection which is not affected by a wavelength variation or a lens movement as described above can be attained.

Alternatively, the tracking error (TE) signal may be obtained from only a suitable combination of the outputs of the 2-split light detecting elements 328a and 328b, and 330a and 330b, or the 2-split light detecting elements 329a and 329b, and 331a and 331b.

In the hologram element 302 shown in (FIG. 23 (d)), only the hologram patterns E and G are disposed and the hologram pattern F is not disposed so that the light spots 322 and 324 are not formed. Also in this case, however, the jitter characteristics of the high frequency (RF) signal and the focusing error (FE) signal can be improved in the same manner as described above. Since the light detecting elements 329 and 331 are not required, the configuration of the light detecting elements can be simplified.

In the first to fourth embodiments, pickups for an optical disk have been described. In the case where the invention is applied to a pickup for a magneto optical disk, when an element(s) for polarization separation may be disposed between the half-mirror and the optical detector, it is possible to use the pickup in the same manner as described above.

In the above, a hologram element is configured by a diffraction grating. Alternatively, a hologram of any kind may be used as far as it has a diffraction function directed in the track direction.

What is claimed is:

1. An optical pickup device comprising:
 a light source irradiating a recording medium with plural light spots of light emitted therefrom;
 a plurality of light detecting elements to which reflected light of the light spots are guided, respectively, to synthesize and compare outputs of said light detecting elements, thereby reading information recorded in tracks of the record medium, and detecting a tracking error and a focusing error; and
 a hologram element which splits incident light from the light source into plural beams that form said plural light spots, said hologram element being disposed in an optical path between the light source and the record medium, said hologram element being split by a split line on an optical axis of the light source, said split line extending in a direction substantially perpendicular to a track of the medium, said hologram element comprising a hologram pattern that diffracts the light from said light source in a direction substantially parallel to the track, said hologram pattern being disposed on at least one side of said split line, diffraction conditions on opposite sides of said split line being different from each other.

2. An optical pickup device according to claim 1, wherein said hologram pattern is disposed on only one side of said split line.

3. An optical pickup device according to claim 1, wherein said hologram pattern has an outline which is symmetrical about said split line.

4. An optical pickup device according to claim 3, wherein said hologram pattern is different in grating interval and grating direction on opposite sides of said split line.

5. An optical pickup device comprising:
 a light source irradiating a recording medium with plural light spots of light emitted therefrom;
 a plurality of light detecting elements to which reflected light of the light spots are guided, respectively, to synthesize and compare outputs of said light detecting elements, thereby reading information recorded in tracks of the record medium, and detecting a tracking error and a focusing error; and
 a hologram element which splits incident light from the light source into plural beams that form said plural light spots, said hologram element being disposed in an optical path between the light source and the record medium, said hologram element being split by a split line on an optical axis of the light source, said split line extending in a direction substantially perpendicular to a track of the medium, said hologram element comprising a hologram pattern that diffracts the light from said light source in a direction substantially parallel to the track, said hologram pattern being disposed on at least one side of said split line, and wherein at least one of said light detecting elements is a split light detecting element, said split light detecting element comprising split element pieces that are integrated into a single body in accordance with synthesis and comparison states of outputs of said split element pieces.

6. An optical pickup device according to claim 5, wherein said split element pieces handle the same polarity in synthesis and comparison of outputs.

7. An optical pickup device according to claim 5, wherein said split light detecting element is a 3-split light detecting element which receives reflected light from 2 light spots.

8. An optical pickup device according to claim 5, wherein, in said light detecting element in which split element pieces are integrated into one body, split element pieces of a 2-split light detecting element from which a sum of outputs in reading of information, and detection of a tracking error and a focusing error is always obtained are integrated into one body.

9. An optical pickup device as recited in claim 5, wherein diffraction conditions of said hologram element are different on opposite sides of said split line.

10. An optical pickup device comprising:
 a light source irradiating a recording medium with plural light spots of light emitted therefrom;
 a plurality of light detecting elements to which reflected light of the light spots are guided, respectively, to synthesize and compare outputs of said light detecting elements, thereby reading information recorded in tracks of the record medium, and detecting a tracking error and a focusing error; and
 a hologram element which splits incident light from the light source into plural beams that form said plural light spots, said hologram element being disposed in an optical path between the light source and the record medium, said hologram element being split by a split line on an optical axis of the light source, said split line extending in a direction substantially perpendicular to a track of the medium, said hologram element comprising a hologram pattern having diffraction gratings in which a grating interval is modulated, said hologram pattern being disposed on at least one side of said split line, said diffraction gratings diffracting the light from said light source in a direction substantially parallel to the track, and wherein said diffraction gratings on opposite sides of said split line are different from each other in fundamental grating interval.

11. An optical pickup device according to claim 10, wherein said hologram pattern is disposed on both sides of said split line and has an outline which is symmetrical about said split line.

12. An optical pickup device according to claim 11, wherein said hologram pattern is different in fundamental grating interval and grating direction on opposite sides of said split line.

13. An optical pickup device according to claim 10, wherein said hologram pattern is disposed on only one side of said split line.

14. An optical pickup device comprising:
 a light source irradiating a recording medium with plural light spots of light emitted therefrom;
 a plurality of light detecting elements to which reflected light of the light spots are guided, respectively, to synthesize and compare outputs of said light detecting elements, thereby reading information recorded in tracks of the record medium, and detecting a tracking error and a focusing error; and
 a hologram element which splits incident light from the light source into plural beams, said hologram element being disposed in an optical path between the light source and the record medium, said hologram element comprising first and second hologram pattern regions, said hologram element being split by a split line on an optical axis of the light source, said split line extending in a direction substantially perpendicular to a track of the medium, said first hologram pattern region having a first hologram pattern diffracting the light from said light source in a direction substantially parallel to the track, said first hologram pattern being disposed on at least one side of said split line, diffraction conditions in said first hologram pattern region being different on opposite sides of said split line, said second hologram pattern region having different diffraction conditions from the diffraction conditions of said first hologram pattern region.

15. An optical pickup device according to claim 14, wherein said first hologram pattern is disposed on both sides of said split line, and an outline of said first hologram pattern is symmetrical about said split line.

16. An optical pickup device according to claim 15, wherein said first hologram pattern has a grating interval and a grating direction that are different on opposite sides of said split line.

17. An optical pickup device according to claim 14, wherein said first hologram pattern is disposed on only one side of said split line, and said second hologram pattern region is disposed on both sides of said split line.

* * * * *